(12) United States Patent
Li et al.

(10) Patent No.: US 12,560,466 B2
(45) Date of Patent: Feb. 24, 2026

(54) NON-INVASIVE PLUMBING SENSOR SYSTEM

(71) Applicant: University of Cincinnati, Cincinnati, OH (US)

(72) Inventors: Tao Li, Mason, OH (US); Steven G. Buchberger, Montgomery, OH (US); Chandrashekhar Choudhary, Cincinnati, OH (US); Gagan Batra, San Jose, CA (US); Toritseju Omaghomi, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 306 days.

(21) Appl. No.: 18/495,073

(22) Filed: Oct. 26, 2023

(65) Prior Publication Data

US 2024/0141629 A1     May 2, 2024

Related U.S. Application Data

(60) Provisional application No. 63/381,149, filed on Oct. 27, 2022.

(51) Int. Cl.
  *G01F 1/66*       (2022.01)
  *G01F 1/684*      (2006.01)
(52) U.S. Cl.
  CPC ............ *G01F 1/666* (2013.01); *G01F 1/6847* (2013.01)
(58) Field of Classification Search
  CPC ............................ G01F 1/666; G01F 1/68–699
  See application file for complete search history.

(56) References Cited

U.S. PATENT DOCUMENTS

| | | | |
|---|---|---|---|
| 9,335,297 B1 * | 5/2016 | Cummins | ............... E03C 1/057 |
| 9,749,792 B2 | 8/2017 | Klicpera | |
| 10,455,441 B2 | 10/2019 | Baroudi et al. | |
| 10,704,979 B2 | 7/2020 | Bailey | |
| 10,732,069 B2 | 8/2020 | Horne et al. | |

(Continued)

OTHER PUBLICATIONS

IFM, Article, New benchmark in thermal flow measurement, Calorimetric flow meter for liquids and gases, https://www.ifm.com/binaries/content/assets/pdf-files/en/product-news/2016/ifm-sa5000-calorimetric-flow-meter-for-liquids-and-gases-gb-16.pdf, IFM Article No. 78001883, Apr. 2016 (2 pages).

(Continued)

*Primary Examiner* — Justin N Olamit
(74) *Attorney, Agent, or Firm* — Wood Herron & Evans LLP

(57) ABSTRACT

Systems and methods for monitoring a plumbing system. A sensor module includes an acoustic flow sensor, and is configured to be attached to a water pipe. In response to receiving sound at the acoustic flow sensor above a threshold level, the sensor module wakes up from a low-power sleep mode and begins collecting acoustic data. The acoustic data is analyzed to determine if water is flowing through the pipe, and if so, a thermal flow sensor may also be activated. Flow data is collected while the water is flowing to document the flow event. In response to the sensor module determining the flow of water has stopped, the collected data is transmitted to a remote server, and the sensor module returns to sleep mode. Multiple sensor modules can be deployed to form a sensor network that communicates wirelessly to monitor the plumbing system.

18 Claims, 23 Drawing Sheets

(56) References Cited

U.S. PATENT DOCUMENTS

| | | | | |
|---|---|---|---|---|
| 10,805,697 | B2 | 10/2020 | Stamatakis et al. | |
| 10,992,752 | B2 | 4/2021 | Graefe et al. | |
| 11,821,770 | B2 * | 11/2023 | Raduchel | G01F 1/666 |
| 12,222,231 | B2 * | 2/2025 | Raduchel | G01F 1/666 |
| 2013/0085688 | A1 * | 4/2013 | Miller | G01F 1/66 |
| | | | | 702/48 |
| 2016/0161310 | A1 | 6/2016 | Leaders et al. | |

OTHER PUBLICATIONS

Steven Buchberger, Emerging Water Technology Symposium, Estimating Peak Water Demands in Buildings with Efficient Fixtures: Progress and Prognosis, https://www.iapmo.org/media/5292/7-buchberger-estimating-peak-water-demands.pdf, images, May 15, 2018.

Toritseju Omaghomi, Ph.D., et al., Abstract, Probability of Water Fixture Use during Peak Hour in Residential Buildings, ASCE/Library, Publication: Journal of Water Resources Planning and Management, vol. 146, Issue 5, https://doi.org/10.1061/(ASCE)WR.1943-5452.0001207, Technical Papers, Mar. 12, 2020.

Anderson-Negele, Calorimetric Flow Measurement, Operating principle of the calorimetric flow measurement, https://www.anderson-negele.com/uk/flow-sensors/calorimetric-flow-measurement/, 2022.

Dangerous Prototypes, App note: Thermal mass flow sensors for gas and liquid applications, http://dangerousprototypes.com/blog/2019/08/25/app-note-thermal-mass-flow-sensors-for-gas-and-liquid-applications/ Aug. 25, 2019.

Bronkhorst, Thermal Mass flow sensor for liquids, https://www.bronkhorst.com/int/service-support-1/technologies/thermal-mass-flow-sensor-for-liquids/, Copyright © 2024 Bronkhorst.

Energy Control Technologies, Temperature, Strap-On/Pipe Clamp Temperature Sensors, Tasseron THTSCF00: Mini Strap-On Temperature Sensor with NEMA 3/IP 54 Injection-Molded Enclosure, 1k Nickel 891 Ohm RTD @ 32 Deg F (0 Deg C) Thermistor, Conduit Adapter, 5-Year Warranty, Assembled in the USA, https://www.energycontrol.com/Tasseron-THTSCF00?gclid=Cj0KCQjwkt6aBhDKARIsAAyeLJ1S-hakT6tX3eUsbmEYoeLzOPTcPjaz5RNFdLgbm2ueBLwJC8f8U24aAIDKEALw_wcB, viewed on-line Feb. 2024.

ResearchGate, An IoT System for Monitoring and Data Collection of Residential Water End-Use Consumption, https://www.researchgate.net/publication/334957395, Aug. 2019.

Marko Hepp et al., Design & Products, MEMS Technologies, MEMS sensor signal conditioning for a thermal flow meter, https://datasheet.datasheetarchive.com/originals/crawler/ichaus.de/a6733bf9fd201573166531088e642650.pdf, Electronic Engineering Times Europe, Mar. 2013, pp. 42-44.

* cited by examiner

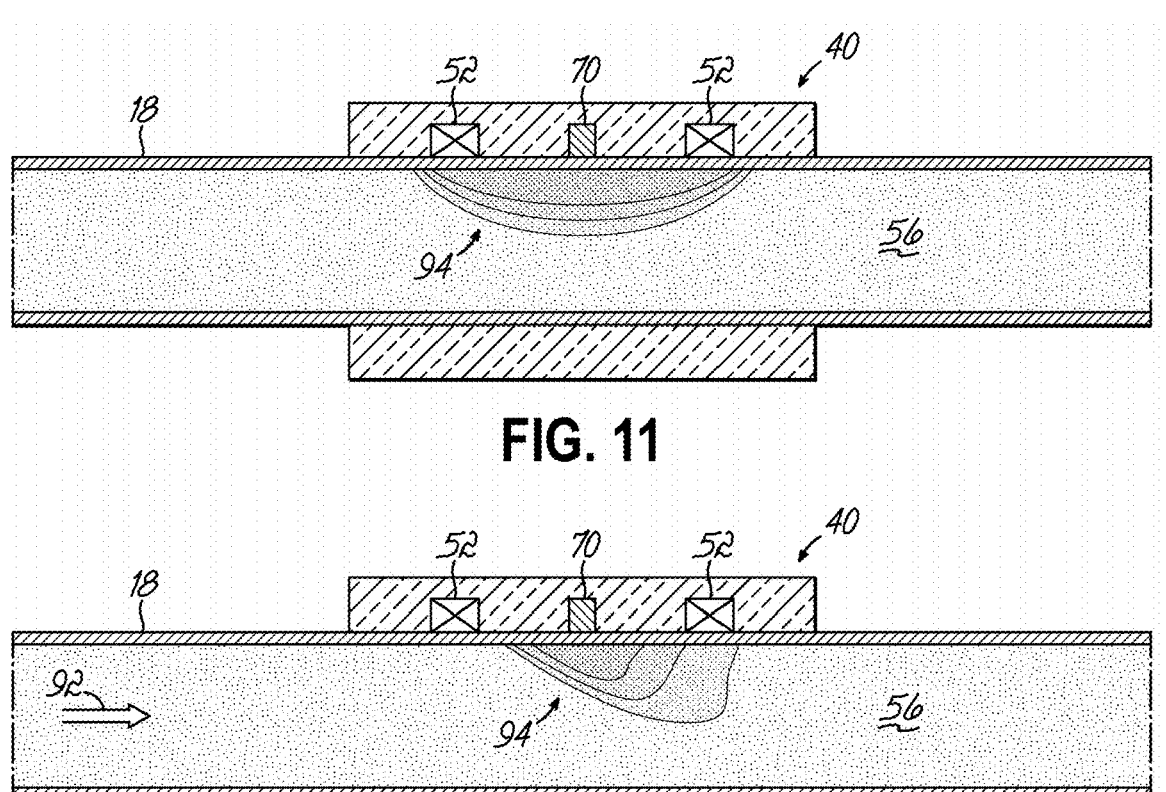
FIG. 11
FIG. 12
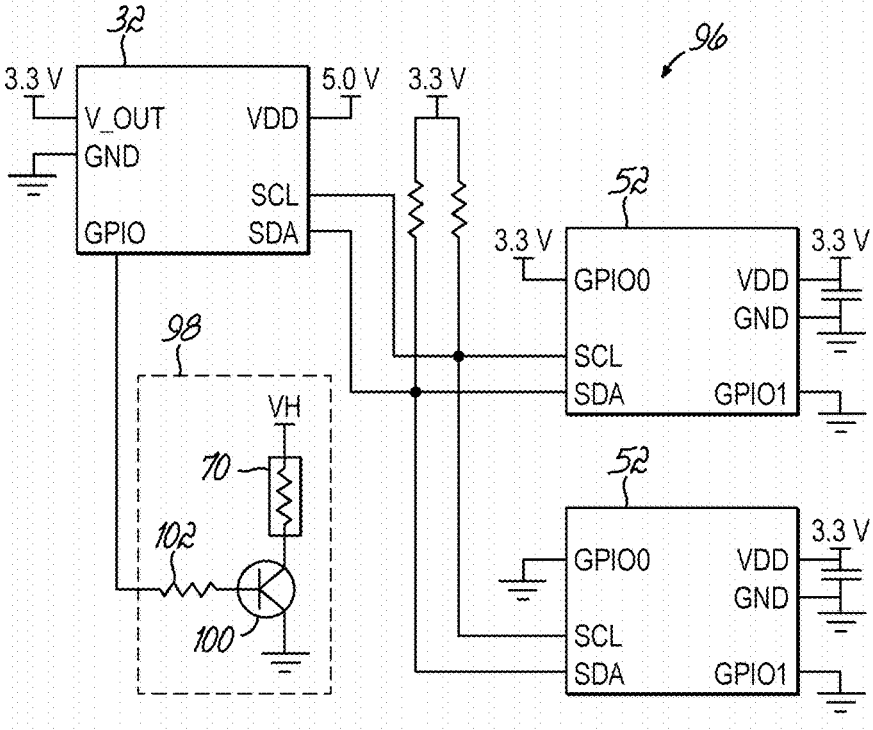
FIG. 13

NON-INVASIVE PLUMBING SENSOR SYSTEM

CROSS-REFERENCE TO RELATED APPLICATIONS

The present application claims the filing benefit of U.S. Provisional Application Ser. No. 63/381,149, filed Oct. 27, 2022, the disclosure of which is incorporated by reference in its entirety.

GOVERNMENT RIGHTS

This invention was made with government support under 70NANB21H014 and 70NANB21H181 awarded by the National Institute of Standards and Technology. The government has certain rights in the invention.

TECHNICAL FIELD

This invention generally relates to monitoring of plumbing systems and, in particular, to systems and methods for monitoring plumbing systems to detect waterflow.

BACKGROUND

Instantaneous peak water demand is an important consideration when designing plumbing systems for a new buildings because it governs the size and cost of the water supply system, such as service line and meter size, heater capacity, pipe diameters, valves, fixtures, and so on. With new efficient plumbing fixtures being widely adopted, the traditional standard method to estimate peak water demand based on the Hunter's curve, which was developed in 1940, has become outdated. This has resulted in significantly over-sized plumbing systems being installed in both residential and commercial buildings. Oversized plumbing systems can trigger potential water-energy problems such as higher construction cost, wasted energy/water from inefficient water heating, and public health concerns from the presence of opportunistic pathogens like *legionella*.

Improved methods of estimating water use could be developed using information regarding the probability of fixture use during peak hours for each fixture type in a building. This probability is commonly referred to as the "p-value" of the fixture. Unfortunately, this type of data is rarely available due to the high cost of deploying waterflow sensors, which require modification of existing plumbing and inline insertion of the sensors into waterpipes.

Thus, there is a need for improved systems and methods for monitoring waterflow through fixtures in plumbing systems.

SUMMARY

In an aspect of the invention, a plumbing sensor system is provided. The plumbing sensor system includes an acoustic flow sensor configured to receive sound from a waterpipe, one or more processors in communication with the acoustic flow sensor, and a memory coupled to the one or more processors. The memory includes program code that, when executed by the one or more processors, causes the system to, in response to the sound received by the acoustic flow sensor exceeding an acoustic threshold, collect acoustic data, and in response to the sound received by the acoustic flow sensor not exceeding the acoustic threshold, not collect the acoustic data.

In an embodiment of the system, the acoustic flow sensor may be configured to transmit a trigger signal to the one or more processors in response to the sound received from the waterpipe exceeding the acoustic threshold, and the program code may be configured to cause the system to collect the acoustic data from the acoustic flow sensor in response to receiving the trigger signal.

In another embodiment of the system, the system may further include a thermal flow sensor configured to detect waterflow in the waterpipe, and the program code may further cause the system to determine if the acoustic data is indicative of the waterflow, in response to the acoustic data being indicative of the waterflow, activate the thermal flow sensor, and in response to the acoustic data being not being indicative of the waterflow, not activate the thermal flow sensor.

In another aspect of the invention, another plumbing sensor system is provided. The plumbing sensor system includes the acoustic flow sensor configured to receive sound from the waterpipe, the thermal flow sensor configured to detect waterflow in the waterpipe, the one or more processors in communication with the acoustic flow sensor and the thermal flow sensor, and the memory coupled to the one or more processors. The memory includes program code that, when executed by the one or more processors, causes the system to, in response to the sound received by the acoustic flow sensor being indicative of waterflow, activate the thermal flow sensor, and in response to the sound received by the acoustic flow sensor not being indicative of waterflow, not activate the thermal flow sensor.

In an embodiment of the system, the program code may further cause the system to, in response to activating the thermal flow sensor, receive temperature data from the thermal flow sensor indicative of the temperature of the waterpipe at each of at least two different points on the waterpipe, and determine a water flow rate in the waterpipe based on the temperature data.

In another embodiment of the system, the acoustic flow sensor may be configured to transmit a trigger signal to the one or more processors in response to the sound received from the waterpipe exceeding an acoustic threshold. In this embodiment, the program code may be further configured to cause the system to, in response to receiving the trigger signal, collect acoustic data from the acoustic flow sensor, and determine if the acoustic data is indicative of waterflow.

In another embodiment of the system, the thermal flow sensor may be inactive, and the program code may cause the system to determine if the acoustic data is indicative of waterflow by filtering noise from the acoustic data to generate filtered acoustic data, generating a signal strength indicator based on the filtered acoustic data, comparing the signal strength indicator to a flow event start threshold, determining the acoustic data is indicative of waterflow if the signal strength indicator exceeds the flow event start threshold, and determining the acoustic data is not indicative of waterflow if the signal strength indicator does not exceed the flow event start threshold.

In another embodiment of the system, the thermal flow sensor may be active, and the program code may further cause the system to collect acoustic data from the acoustic flow sensor, determine if the acoustic data is indicative of waterflow, in response to the acoustic data being indicative of waterflow, collect temperature data from the thermal flow sensor, and in response to the acoustic data not being indicative of waterflow, deactivate the thermal flow sensor.

In another embodiment of the system, the program code may further cause the system to, in response to the acoustic data not being indicative of waterflow, record the temperature data, and transmit the acoustic data and the temperature data to a remote server.

In another embodiment of the system, the acoustic flow sensor, the thermal flow sensor, the one or more processors, and the memory may be part of a sensor module that further comprises a wireless transceiver. In this embodiment, the system may further comprise a wireless network gateway in communication with the sensor module and the remote server, and the program code may cause the system to transmit the acoustic data and the temperature data to the remote server through the wireless network gateway.

In another embodiment of the system, the program code may cause the system to determine if the acoustic data is indicative of waterflow by filtering noise from the acoustic data to generate filtered acoustic data, generating a signal strength indicator based on the filtered acoustic data, comparing the signal strength indicator to a signal strength threshold, determining the acoustic data is indicative of waterflow if the signal strength indicator exceeds the signal strength threshold, and determining the acoustic data is not indicative of waterflow if the signal strength indicator does not exceed the signal strength threshold.

In another embodiment of the system, the signal strength threshold may be a flow event stop threshold.

In another embodiment of the system, the thermal flow sensor may include a heater bridge including a span and a heating element positioned on a waterpipe-facing side of the span, wherein the span includes a recess on each side of the heating element that thermally isolates the heating element from at least one of the span and the waterpipe.

In another embodiment of the system, the acoustic flow sensor may include a circuit board, an acoustic transducer, and an acoustic coupler. The circuit board may have an outward facing side, a waterpipe-facing side, and a through hole connecting the outward facing side to the waterpipe-facing side. The acoustic transducer may be operatively coupled to the outward facing side of the circuit board proximate to the through hole, and the acoustic coupler may be configured to define an acoustic chamber between the waterpipe-facing side of the through hole and the waterpipe.

In another aspect of the invention, a method of monitoring the plumbing system is provided. The method includes receiving sound at the acoustic flow sensor operatively coupled to the waterpipe, in response to the sound received by the acoustic flow sensor exceeding the acoustic threshold, collecting acoustic data, and in response to the sound received by the acoustic flow sensor not exceeding the acoustic threshold, not collecting the acoustic data.

In an embodiment of the method, the method may further include, in response to the acoustic data being indicative of waterflow, activating the thermal flow sensor, and in response to the acoustic data not being indicative of the waterflow, not activating the thermal flow sensor.

In another embodiment of the method, the acoustic flow sensor may include the acoustic transducer, and the method may further include receiving the trigger signal from the acoustic transducer in response to the sound received from the waterpipe exceeding the acoustic threshold, in response to receiving the trigger signal, collecting the acoustic data from the acoustic flow sensor, and determining if the acoustic data is indicative of waterflow.

In another aspect of the system, another method of monitoring the plumbing system is provided. The method includes receiving the sound at the acoustic flow sensor operatively coupled to the waterpipe, in response to the sound received by the acoustic flow sensor being indicative of waterflow, activating the thermal flow sensor, and in response to the sound received by the acoustic flow sensor not being indicative of waterflow, not activating the thermal flow sensor.

In an embodiment of the method, the method may further include receiving temperature data from the thermal flow sensor indicative of the temperature of the waterpipe at each of at least two different points on the waterpipe, and determining a water flow rate in the waterpipe based on the temperature data.

In another embodiment of the method, the acoustic flow sensor may include the acoustic transducer, and the method may further include receiving the trigger signal from the acoustic transducer in response to the sound received from the waterpipe exceeding the acoustic threshold, in response to receiving the trigger signal, collecting acoustic data from the acoustic flow sensor, and determining if the acoustic data is indicative of waterflow.

In another embodiment of the method, determining if the acoustic data is indicative of waterflow may include filtering noise from the acoustic data to generate the filtered acoustic data, generating the signal strength indicator based on the filtered acoustic data, comparing the signal strength indicator to the flow event start threshold, determining the acoustic data is indicative of waterflow if the signal strength indicator exceeds the flow event start threshold, and determining the acoustic data is not indicative of waterflow if the signal strength indicator does not exceed the flow event start threshold.

In another embodiment of the method, the method may further include collecting the acoustic data from the acoustic flow sensor, determining if the acoustic data is indicative of waterflow, in response to the acoustic data being indicative of waterflow, collecting temperature data from the thermal flow sensor, and in response to the acoustic data not being indicative of waterflow, deactivating the thermal flow sensor.

In another embodiment of the method, the method may further include, in response to the acoustic data not being indicative of waterflow, recording the temperature data and transmitting the acoustic data and the temperature data to a remote server.

In another embodiment of the method, the acoustic data and the temperature data may be transmitted to the remote server through the wireless network gateway.

In another embodiment of the method, determining if the acoustic data is indicative of waterflow may include filtering noise from the acoustic data to generate filtered acoustic data, generating the signal strength indicator based on the filtered acoustic data, comparing the signal strength indicator to the signal strength threshold, determining the acoustic data is indicative of waterflow if the signal strength indicator exceeds the signal strength threshold, and determining the acoustic data is not indicative of waterflow if the signal strength indicator does not exceed the signal strength threshold.

In another embodiment of the method, the signal strength threshold may be the flow event stop threshold.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

FIGS. 11 and 12 are cross-sectional views showing temperature gradients in a waterpipe for an exemplary thermal flow sensor with and without waterflow.

FIG. 13 is a schematic view of an exemplary circuit of the thermal flow sensor of FIG. 2.

Figure 1:
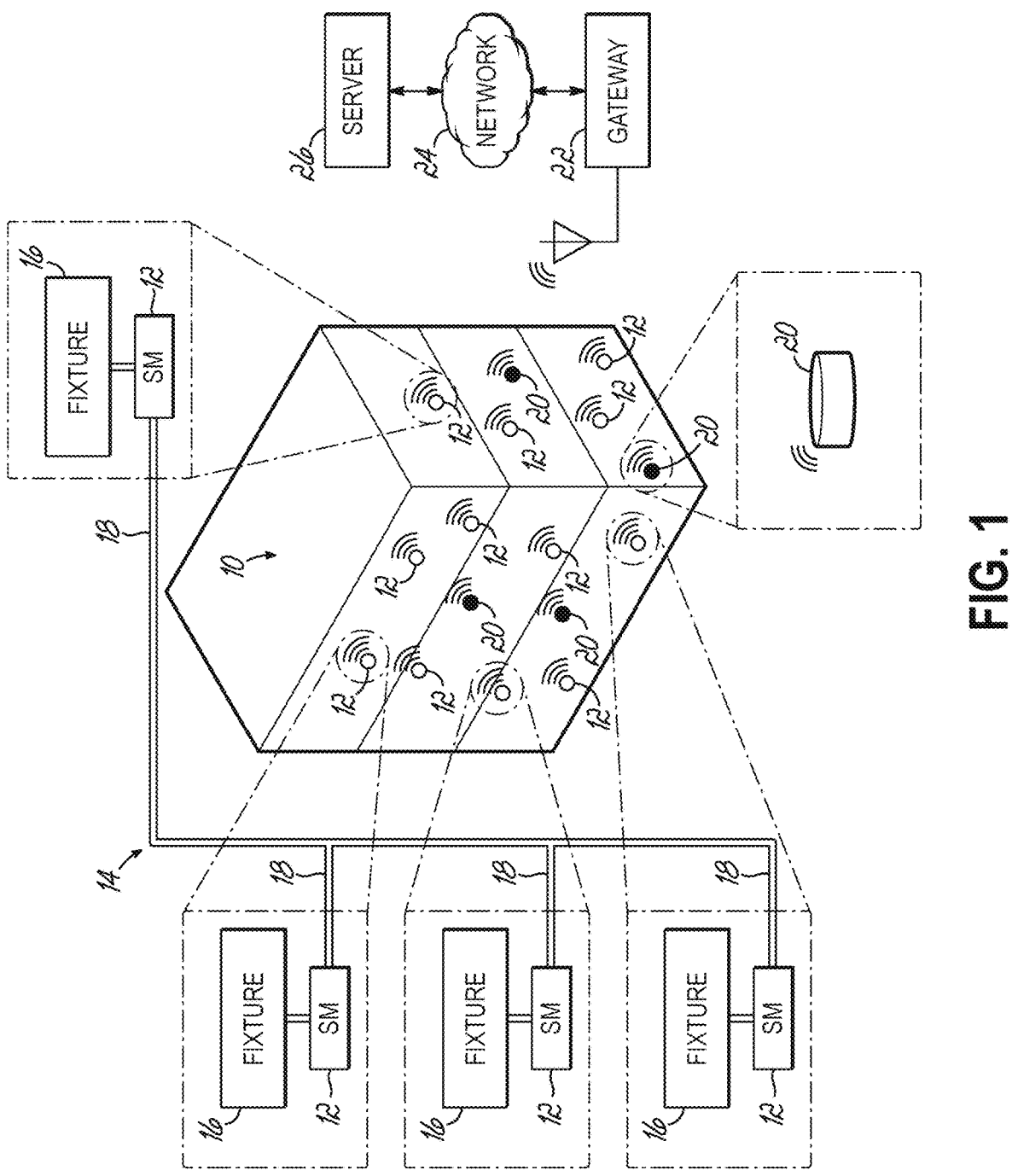
FIG. 1 is a diagrammatic view of an exemplary sensor network including a plurality of sensor modules.

It should be understood that the appended drawings are not necessarily to scale, and may present a somewhat simplified representation of various features illustrative of the basic principles of the invention. The specific design features of the sequence of operations disclosed herein, including, for example, specific dimensions, orientations, locations, and shapes of various illustrated components, may be determined in part by the particular intended application and use environment. Certain features of the illustrated embodiments may have been enlarged or distorted relative to others to facilitate visualization and a clear understanding. In particular, thin features may be thickened, for example, for clarity or illustration.

DETAILED DESCRIPTION

Embodiments of the present invention include a low-cost distributed wireless plumbing sensor system that includes one or more sensor modules. Each sensor module may include a self-contained power source (e.g., a battery) and communicate through a wireless network to facilitate deployment in plumbing systems. Each sensor module includes an acoustic flow sensor and a thermal flow sensor to provide waterflow detection that is accurate and non-invasive. The sensor modules may be operatively coupled to waterpipes proximate to strategically selected fixtures in the plumbing system to monitor water use by each selected fixture. The plumbing sensor system may collect time-stamped flow event data over a predetermined period, e.g., 1 to 2 months, and transmit this data in real time to a centralized server for analysis. The analysis may include extracting p-values that can be used to estimate instantaneous peak usage in similar operating environments.

Embodiments of the present invention may thereby facilitate determining p-values of plumbing fixtures by collecting field data on the fraction of time a fixture is in use, e.g., time-stamped binary (on/off) switching events. Advantageously, the disclosed data collection devices are non-invasive, low-cost, easy to deploy, and can be recovered and redeployed once sufficient data on a particular plumbing system has been collected. These features make the devices amenable to large scale deployment, thereby providing better estimation accuracy of p-values.

As used herein, the terms "upstream" and "downstream" describe relative positions along a waterpipe as they relate to the normal flow of water through the waterpipe, with an upstream location being closer to the source of water flowing through the waterpipe than a downstream position. In addition, the term "exceed", when used with respect to a threshold, indicates that the value of the parameter exceeding the threshold has crossed the threshold in a manner that indicates the occurrence of an event or a change in state. This crossing may be due to the value of the parameter increasing from less than the threshold to greater than the threshold, or due to the value of the parameter decreasing from greater than the threshold to less than the threshold, depending on the context of how the threshold is exceeded.

FIG. 1 depicts an exemplary plumbing sensor system 10 deployed in a multistory building in accordance with an embodiment of the present invention. The plumbing sensor system 10 includes a plurality of sensor modules 12 distributed throughout the plumbing system 14 of the building. The plumbing system 14 includes a plurality of fixtures 16 connected to waterpipes 18. The fixtures 16 may include, but are not limited to, toilets, sinks, faucets, washing machines, ice makers, water coolers, refrigerators, or any other device or appliance that may be connected to a waterpipe 18. The plumbing sensor system 10 may further include one or more wireless routers 20 or other network components configured to operatively connect each of the sensor modules 12 to a wireless network gateway 22. The wireless network gateway 22 may connect the plumbing sensor system 10 to a wide area network 24 (e.g., the Internet) and/or local computer resources (e.g., a server and/or network database—not shown). The sensor modules 12 may use the wide area network 24 to communicate with and transmit data to one or more remote servers 26, such as a database and/or web server that enables users to access data uploaded by the sensor modules 12.

The sensor modules 12, wireless routers 20 and/or wireless network gateway 22 of plumbing sensor system 10 may communicate using any suitable communication protocol, such as the Zigbee protocol. The term Zigbee is commonly used to refer to an IEEE 802.15.4-based specification for a suite of high-level communication protocols used to create personal area networks. Each sensor module 12 may be self-powered for direct attachment to waterpipes 18 without the need for connection to a cable or external power source. The self-contained power source and wireless connectivity of the sensor modules 12 may facilitate placing the sensor modules strategically selected sites throughout monitored building to collect data on various types of plumbing fixtures 16.

Wireless routers 20 may be deployed to help expand the coverage range of the plumbing sensor system 10 as necessary. The wireless network gateway 22 may include a wireless coordinator 28 (e.g., Zigbee coordinator—see FIG. 38) and a computer module 29 (e.g., a Raspberry Pi unit—see FIG. 38). The wireless coordinator 28 may interface with sensor modules 12 and wireless routers 20 to synchronize time among all sensor modules 12 and ensure proper time stamp recording. The computer module 29 may provide functions such as system control, data collection, and data management. The computer module 29 may also interface with wide area network 24 for data storage/backup in the cloud and for remote interaction with end users through applications running on the remote server 26, e.g., a web server and/or database application.

The system software on the computer module 29 may include Python programs for system and data management, as well as JavaScript programs for the web server and web applications for remote user interface and data processing. Python is a high-level, general-purpose programming language that is available from the Python Software Foundation, which is a corporation having a headquarters in Wilmington, Delaware. JavaScript is a programming language that is one of the core technologies of the World Wide Web, and is available from Ecma International, a nonprofit standards organization for information and communication systems headquartered in Geneva, Switzerland. The sensor modules 12 and wireless network gateway 22 may also include microcontroller programs for the Zigbee coordinator/routers for handling Zigbee communication.

Figure 2:
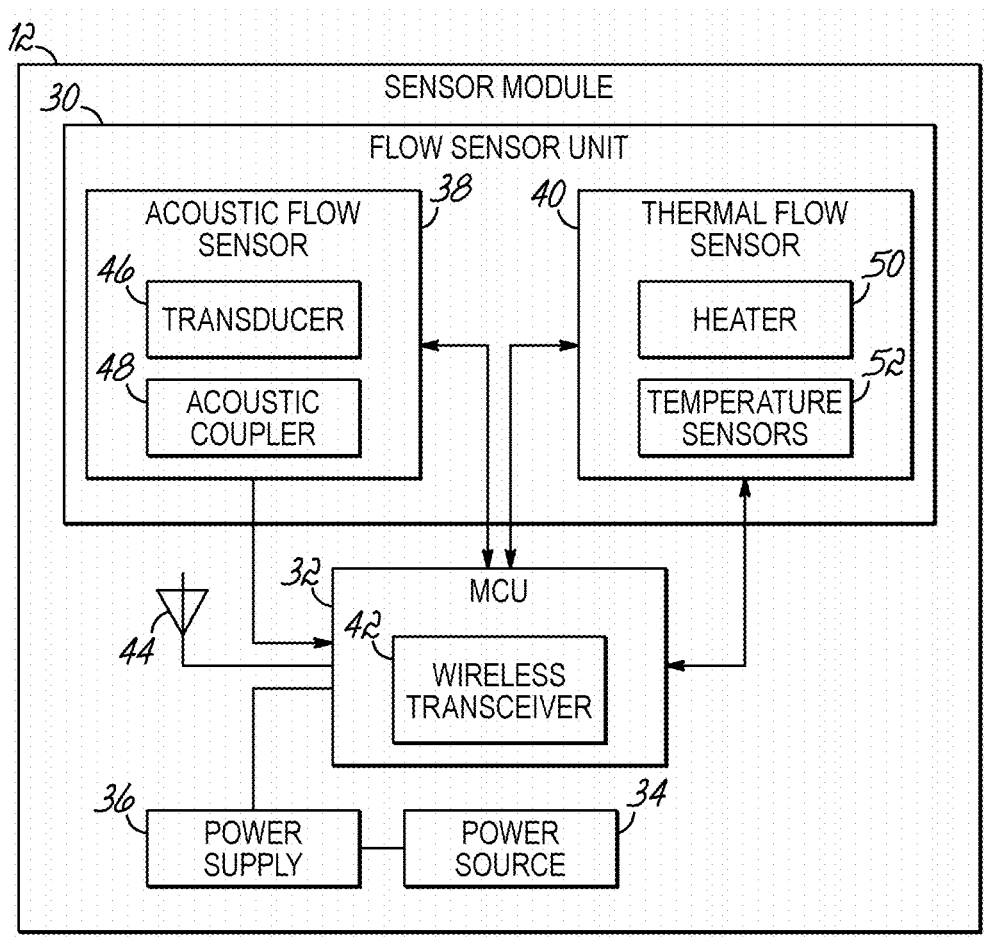
FIG. 2 is a schematic view of an exemplary sensor module of FIG. 1 including an acoustic flow sensor and a thermal flow sensor.

FIG. 2 depicts an exemplary sensor module 12 including a flow sensor unit 30, a microcontroller unit 32, a power source 34 (e.g., a replaceable battery), and a power supply 36. The flow sensor unit 30 includes an acoustic flow sensor 38 and a thermal flow sensor 40. The microcontroller unit 32 may include a wireless transceiver 42 (e.g., a Zigbee transceiver) configured to communicate with the plumbing sensor system 10 through an antenna 44.

The acoustic flow sensor 38 may include an acoustic transducer 46 (e.g., a microphone) and an acoustic coupler 48 (e.g., a coupling ring). The acoustic coupler 48 is configured to improve acoustic coupling between the acoustic transducer 46 and a waterpipe 18 to which the sensor module 12 is attached. The thermal flow sensor 40 includes a heater 50 and temperature sensors 52 that enable waterflow detection and/or water flow rate measurements based on the effect of the flowing water on the propagation of heat generated by the heater 50.

The wireless coordinator 28 may be implemented on a Silicon Labs EFR32MG21 microcontroller unit, which is available from Silicon Laboratories, Inc. of Austin Texas. The microcontroller unit 32 may include wireless function blocks and transceivers for communication with other sensor modules 12, and a universal asynchronous receiver-transmitter (UART) interface to communicate with computer modules 29. The microcontroller unit 32 may have ultra-low transmit and receive power, a current consumption of less than 1.4 μA in the deep sleep mode, and high resolution analog-to-digital conversion (ADC) features in a small size, e.g., $5 \times 5 \times 0.85$ mm$^3$. Tables I and II summarize the main system performance parameters.

TABLE I

| Sensor Module | |
|---|---|
| Parameter | Value |
| Sensor Module Size (Fully Assembled) | $12 \times 6.4 \times 8.1$ cm$^3$ |
| Main PCB Size (Including Antenna) | $36 \times 46$ mm$^2$ |
| Time Resolution for Event Detection | 0.25 sec |
| Battery Capacity | 10,000 mAh |
| Lifetime (70% Battery Capacity Usable) | >68 days |

TABLE II

| Sensor Network | |
|---|---|
| Parameter | Value |
| Wireless Protocol | Zigbee |
| Max. no. of Units (Theoretical/Practical) | 65,536/>100 s |
| Tested Wireless Comm. Range (No Obstacle) | >36 m |
| Tested Wireless Comm. Range (With Obstacle) | >25 m |

The flow sensor unit 30 may combine multiple sensing modalities (e.g., acoustic measurement and calorimetric thermal detection) to provide robust waterflow detection with low power consumption. The acoustic transducer 46 may detect waterflow in real-time (e.g., with a 0.25 sec time resolution) by continuously monitoring sound while in a low-power sleep mode. In an exemplary embodiment, the acoustic transducer 46 may include a PUI Audio PMM-3738-VM1010-R microphone, which is designed for ultra-low power always listening applications, and is manufactured by PUI Audio, Inc. of Dayton, Ohio.

In response to the sound level exceeding a predefined acoustic threshold, the acoustic flow sensor 38 may transmit a trigger signal to the microcontroller unit 32. In response to receiving the trigger signal, the microcontroller unit 32 may begin collecting acoustic data from the acoustic transducer 46. This acoustic data may be processed using a waterflow detection algorithm to determine if the sound is indicative of a flow event. If a flow event is detected (e.g., the opening of a water valve in the fixture 16), the microcontroller unit 32 may activate the thermal flow sensor 40 to begin collecting flow data. If a flow event is not detected, the microcontroller unit 32 and acoustic transducer 46 may return to/remain in their respective sleep modes.

The acoustic trigger feature may enable the flow sensor unit 30 to stay in a low-power sleep mode most of the time, and thus increase the amount of time the sensor module 12 can operate without replenishing the power source 34. Due to the presence of the heater 50, the thermal flow sensor 40 may consume more power than the acoustic flow sensor 38. The flow sensor unit 30 may thereby conserve power by only activating the thermal flow sensor 40 in response to detecting a flow event acoustically. This enables the use of the thermal flow sensor 40 to cross check the accuracy of the acoustic detection feature, particularly for longer-duration flow events, such as a person taking a shower. These power saving features may contribute to an estimated sensor module lifetime of over 68 days when powered by a battery pack having a capacity of 10,000 mAh.

The sensor module 12 software may include firmware for local functions such as analog-to-digital conversion, flash, and power management, as well as wireless communication functions. The sensor module software may also include one or more algorithms for each sensing modality to process data and detect waterflow. The acoustic flow detection algorithm may enable fast, real-time flow event detection. An exemplary embodiment of the acoustic flow algorithm may include a data acquisition block, a pre-filtering block, a data processing block, a post-filtering block, and a threshold comparator block. The acoustic flow detection algorithm may include an acoustic noise filtering algorithm that removes noise/interference from the acoustic data. The acoustic flow detection algorithm may then generate a signal strength indicator (SSI) parameter using the filtered acoustic data. The signal strength indicator may be compared to one or more predefined signal strength thresholds (e.g., a flow event start threshold and/or a flow event stop threshold) to determine if there is waterflow through the monitored waterpipe 18. The acoustic flow detection algorithm may be designed based on analysis of a large group of diversified types of noise and waterflow sounds, as well as quantitative evaluations of various algorithm design choices, to maximize the effectiveness in differentiation between sound generated by waterflow and other sounds, referred to herein as noise.

Figure 3:
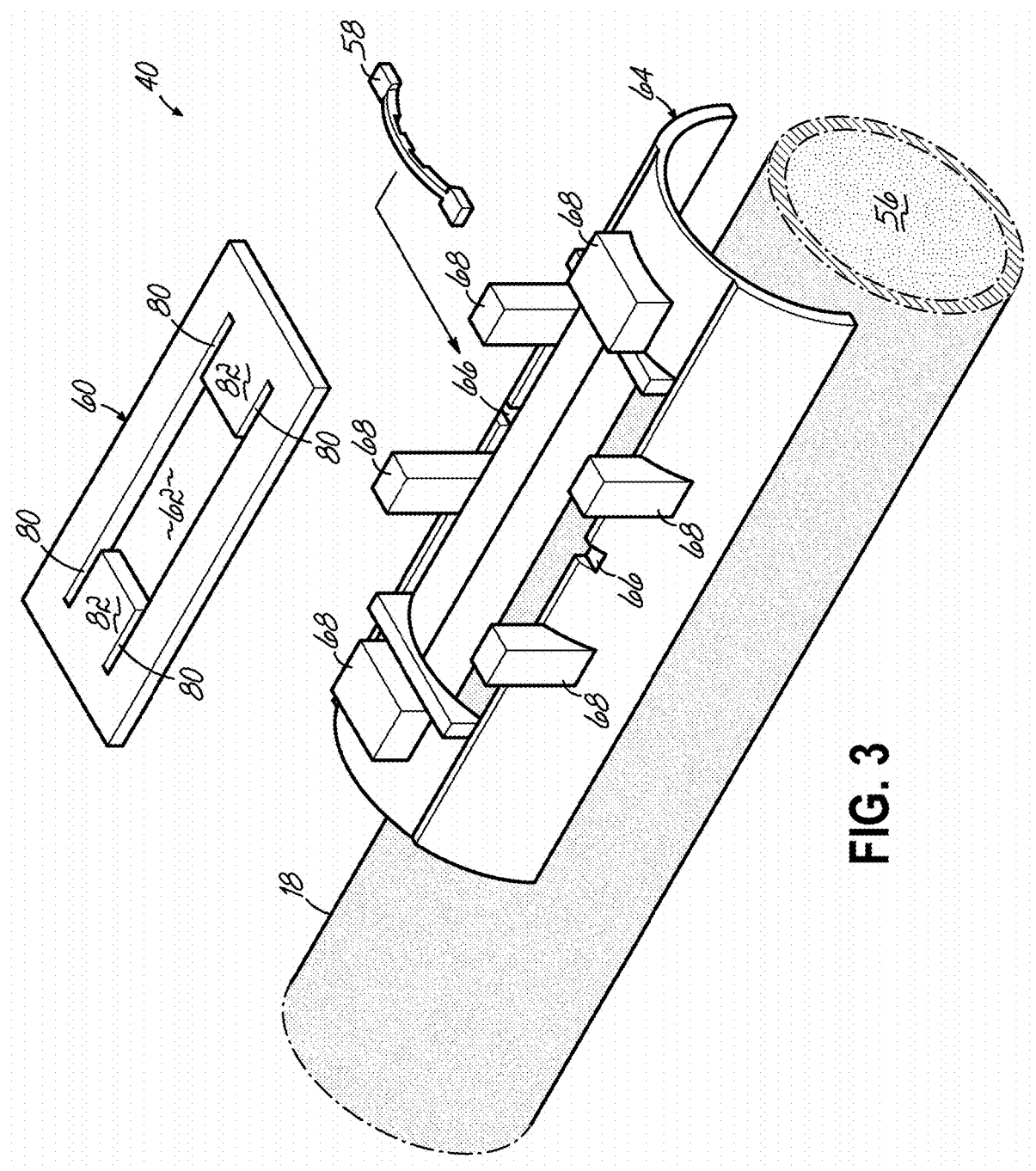
FIG. 3 is a perspective view of an exemplary thermal flow sensor of FIG. 2 including a heater bridge.
Figures 4, 5:
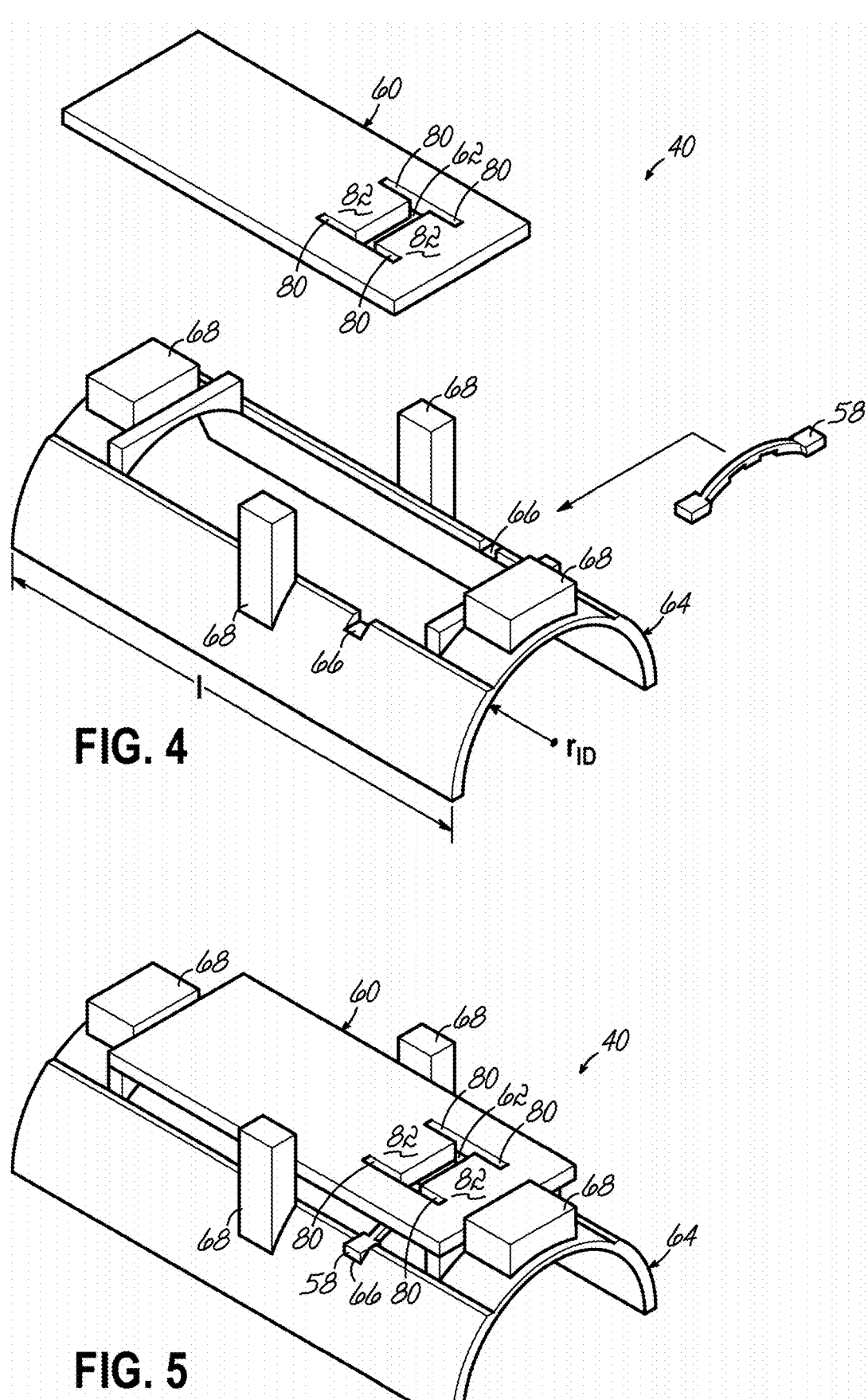
FIGS. 4 and 5 are perspective views of alternative embodiments of the thermal flow sensor of FIG. 3.
Figure 6:
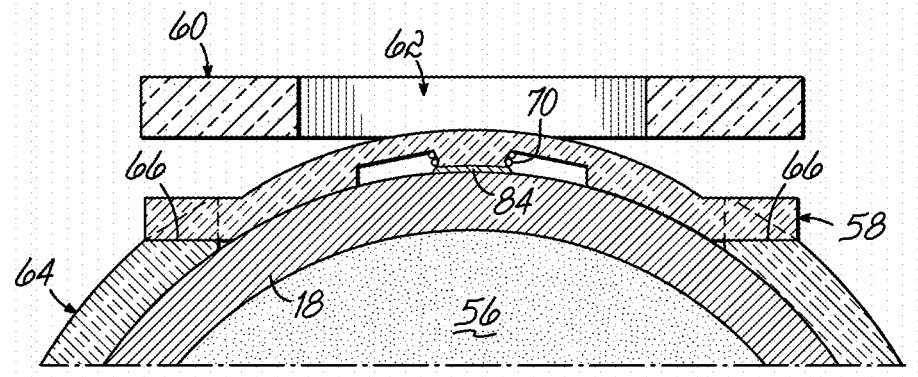
FIGS. 6 and 7 are cross-sectional views of the exemplary thermal flow sensor of FIG. 3.

FIGS. 3-5 depict exemplary embodiments of the thermal flow sensor 40. Each of the depicted thermal flow sensors 40 include a heater bridge 58, circuit board 60 having an opening 62, and sensor mount 64 configured to operatively couple the thermal flow sensor 40 to a waterpipe 18 through which water 56 flows. The sensor mount 64 may include recesses 66 configured to receive the heater bridge 58 and one or more projections 68 configured to receive the circuit board 60. The recesses 66 may be configured to position the heater bridge 58 in the opening 62 of circuit board 60, and the projections 68 may be configured to position the circuit board 60 proximate to the waterpipe 18. The circuit board 60 and sensor mount 64 depicted by FIG. 3 are configured so that the heater bridge 58 is located proximate to the center of the sensor mount 64. In contrast, the circuit board 60 and sensor mount 64 depicted by FIGS. 4 and 5 are configured so that the heater bridge 58 is located closer to one end of the sensor mount 64 than the other end of the sensor mount 64. Thus, it should be understood that embodiments of the thermal flow sensor 40 are not limited to a specific location for the heater bridge 58 or size/position of the opening 62 of circuit board 60. The sensor mount 64 may have a typical length/of about 40 mm and an internal radius of curvature $r_{ID}$ of about 11.1 mm, e.g., when designed for use on a ¾ inch copper waterpipe. Typically, the dimensions of the sensor mount 64 are selected to match the sensor mount 64 to the size of the waterpipe 18 to which the thermal flow sensor 40 is to be coupled, and thus may vary depending on the application.

Figure 7:
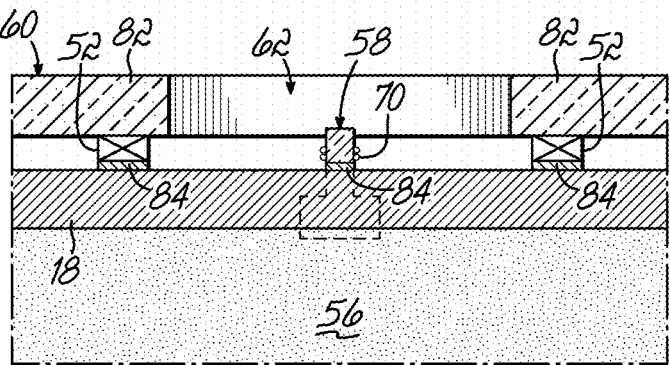
Figure 8:
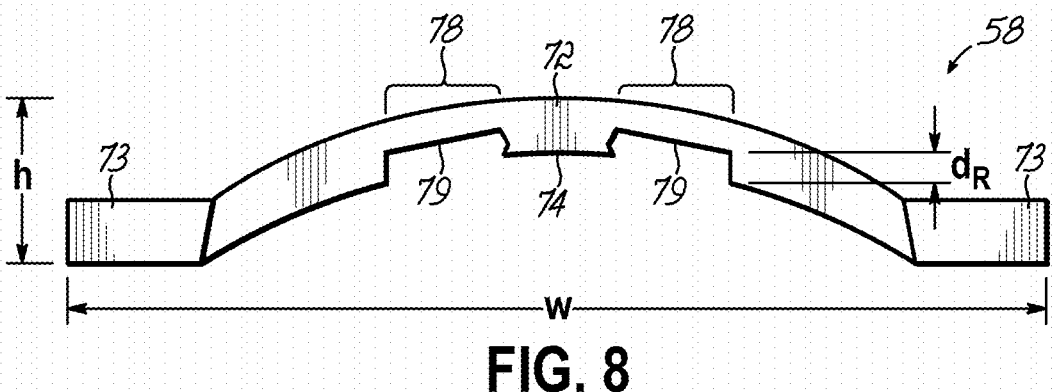
FIG. 8 is a front view of the heater bridge of FIGS. 3-5.
Figure 9:
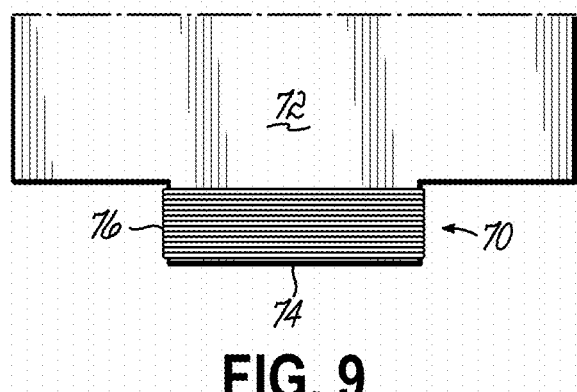
FIG. 9 is a front view of a heating element of the heater bridge of FIG. 8.

FIGS. 6-9 illustrate additional details of an exemplary heater bridge 58. The depicted heater bridge 58 includes a heating element 70, and is configured to place the heating element 70 in close proximity to and/or in thermal contact with a waterpipe 18. As best shown by FIG. 8, exemplary heater bridge 58 includes a span 72 having a foot 73 at each end thereof configured to engage a respective recess 66 of sensor mount 64. The span 72 also includes a projection 74 located on the waterpipe-facing side thereof and generally equidistant from each foot 73. As best shown by FIG. 9, the heating element 70 may include a coil of wire 76 (e.g., nichrome wire) that is wound around the projection 74. The span 72 of heater bridge 58 may be configured to generally follow the curvature of the waterpipe 18. The span 72 may also include a narrowed portion 78 in each side of the heating element 70. Each narrowed portion 78 of span 72 may have width and/or thickness that is less than the remaining portion of the span 72. This reduction in dimensions may be implemented by including one or more recesses 79 in the span 72 each having a depth $d_R$, e.g., $d_R$=0.5 mm.

The resulting reduction in the cross-sectional area of the span 72 may reduce the amount of heat lost from the heating element 70 due to thermal conduction through the span 72. The recesses 79 may also provide a spacing between the span 72 and waterpipe 18 that thermally isolates the span 72 from the waterpipe 18 proximate to the heating element 70. By reducing heat loss from the heating element 70, the narrowed portions 78 of span 72 may reduce the power consumption of the thermal flow sensor 40. The heater bridge 58 may have a height h (e.g., h=2.5 mm) and width w (e.g., w=17.7 mm) that matches the size of the heater bridge 58 to that of the waterpipe 18 to which the thermal flow sensor 40 is to be coupled.

As best shown by FIG. 7, the circuit board 60 may include a plurality of temperature sensors 52 (e.g., two temperature sensors 52), with at least one of the temperature sensors 52 being located upstream of the heating element 70 and another of the temperature sensors 52 being located downstream of the heating element 70. As best shown by FIGS. 3-5, the circuit board 60 may include one or more slots 80 (e.g., four slots) that define one or more extensions 82 (e.g., two extensions) that extend into the opening 62 of circuit board 60. Each temperature sensor 52 may be placed on a respective extension 82 so that the temperature sensors 52 are symmetrically located on opposite sides of the opening 62. A thermally conductive paste 84 may be applied to each of the temperature sensors 52 and/or the heating element 70 to reduce the thermal resistance between the waterpipe 18 and each of the temperature sensors 52 and heating element 70.

The heater bridge 58, opening 62, and slots 80 may provide improved thermal isolation between the temperature sensors 52 and the heater 50 by reducing the number of thermal conduction paths therebetween. This improved thermal isolation may enable better thermal coupling between the heater 50 and the water 56 flowing inside the waterpipe 18, which in turn may improve thermal flow detection. The sensor mount 64 may include guideposts, recesses, or alignment features that facilitate integration of the temperature sensors 52, heater bridge 58 and/or circuit board 60 into the thermal flow sensor 40. The alignment features may be configured to achieve symmetric placement of the temperature sensors 52 on each side of the heater 50. The sensor mount 64 may also include a contour that matches a waterpipe 18 of a predetermined size (e.g., ½, inch, ¾ inch, etc.) to facilitate deployment of the sensor module 12.

Figure 10:
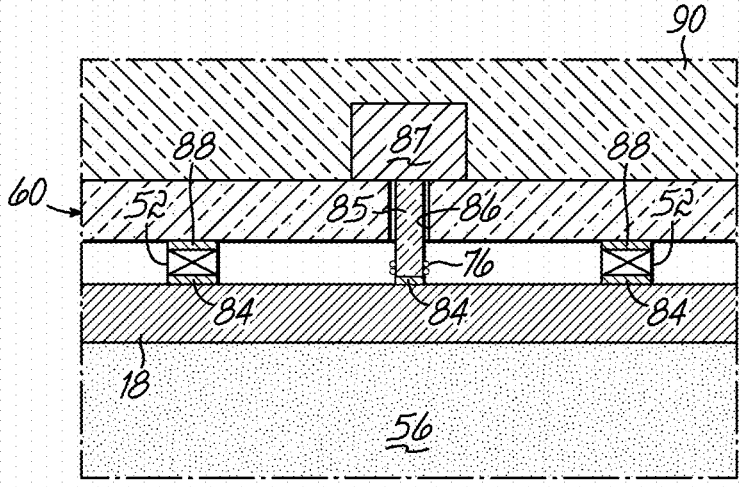
FIG. 10 is a cross sectional view of another exemplary embodiment of the thermal flow sensor of FIG. 2.

FIG. 10 depicts an alternative embodiment of the thermal flow sensor 40 in which the heating element 70 is held in place on the waterpipe 18 by the circuit board 60 rather than a heater bridge 58. In this embodiment, the heating element 70 may be formed by a coil of wire 76 wound around a distal end of a rod 85 that extends through a hole 86 in the circuit board 60. A proximal end of the rod 85 may be operatively coupled to the circuit board 60 by a holder 87. By way of example, the holder 87 may be glued to both the proximal end of the rod 85 and the outward-facing surface of circuit board 60 with a suitable adhesive, such as a cyanoacrylate based glue commonly referred to as "superglue". Each of the temperature sensors 52 may be attached to the pipe-facing surface of circuit board 60 by an adhesion layer 88 (e.g., a solder layer), and the space proximate to the outward-facing side of circuit board 60 may be filled with an insulating material 90 (e.g., a foam or fiber-glass insulation) to reduce parasitic heat loss from the heating element 70. Each of the temperature sensors 52 and heating element 70 may be operatively coupled to the waterpipe 18 with thermally conductive paste 84.

FIGS. 11 and 12 illustrate an exemplary thermal flow sensor 40 having two temperature sensors 52 and one heating element 70 operatively coupled to a waterpipe 18. In FIG. 11 the water is 56 not flowing, and in FIG. 12 the water 56 is flowing from left to right as indicated by single headed arrow 92. One of the temperature sensors 52 is thermally coupled to the waterpipe 18 at a location upstream of the heating element 70, and the other temperature sensor 52 is thermally coupled to the waterpipe 18 at a location downstream from the heating element 70.

When water 56 is not flowing, a temperature gradient 94 generated by the flow of heat away from the heating element 70 is symmetrical. As a result of the symmetrical temperature gradient 94 and placement of temperature sensors 52, the temperature sensors 52 upstream of the heating element 70 should indicate a temperature $T_1$ that is the same as the temperature $T_2$ indicated by the temperature sensor 52 downstream of the heating element 70, i.e., $T_1$=$T_2$. In contrast, when the water 56 is flowing, the temperature gradient is distorted such that the temperature $T_2$ indicated by the temperature sensor 52 downstream of the heating element 70 is greater than the temperature $T_1$ indicated by the temperature sensor 52 upstream of the heating element 70, i.e., $T_2$>$T_1$. Moreover, the temperature difference $T_A$=$T_2$-$T_1$ may vary in a predictable manner dependent on the water flow rate. Thus, the temperature difference $T_A$=$T_2$-$T_1$ can be used for both detection of waterflow and to estimate the water flow rate.

FIG. 13 depicts an exemplary circuit 96 that may be included in an embodiment of the thermal flow sensor 40. The circuit 96 includes a microcontroller unit 32 (e.g., a Raspberry Pi) that is operatively coupled to the temperature sensors 52 and a heater driver 98. Each temperature sensor 52 may communicate with the microcontroller unit 32 using a suitable communication protocol, such as the inter-integrated circuit ($I^2C$) communication protocol. The $I^2C$ protocol is a synchronous, multi-controller/multi-target, packet switched, single-ended, serial communication protocol. The heater driver 98 may include a transistor 100 (e.g., a metal-oxide-semiconductor field-effect transistor (MOSFET)) and one or more additional electrical components 102 (e.g., resistors) that enable the microcontroller unit 32 to activate the heating element 70. The microcontroller unit 32 may be configured to selectively activate the heating element 70, record temperature data received from the two temperature sensors, and determine a water flow rate through the waterpipe 18 based on the received temperature data.

Figure 14:
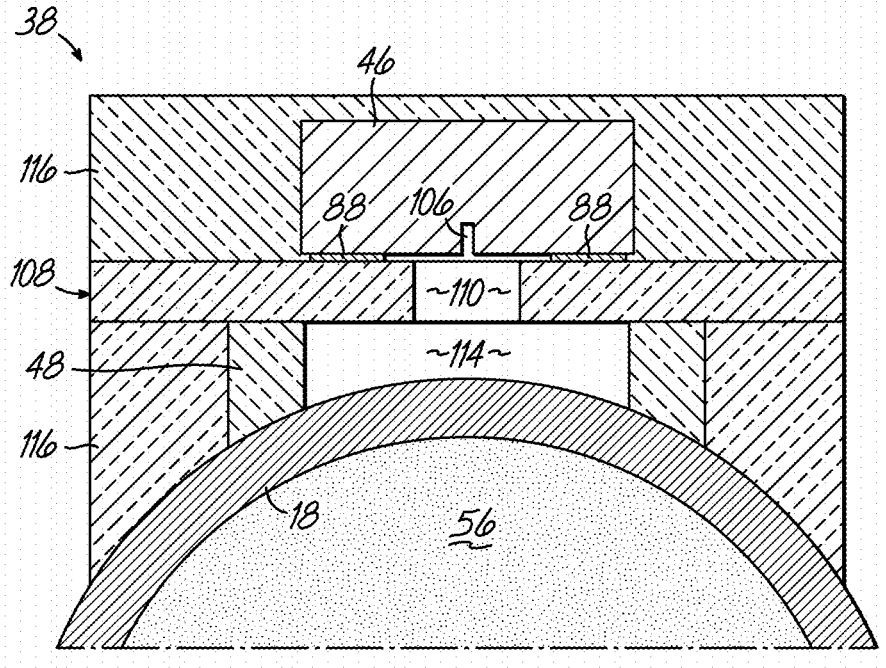
FIG. 14 is a cross-sectional view of an exemplary acoustic flow sensor of FIG. 2 including an exemplary acoustic coupler.

FIG. 14 depicts a cross sectional view of an embodiment of the sensor module 12 illustrating an exemplary acoustic flow sensor 38 operatively coupled to a waterpipe 18. The acoustic transducer 46 of acoustic flow sensor 38 may include an acoustic port 106 and comprise a surface mount device that is operatively coupled to an acoustic flow sensor circuit board 108. The circuit board 108 may include a through hole 110 over which the acoustic transducer 46 is positioned such that the acoustic port 106 is aligned with the through hole 110. The acoustic transducer 46 may be operatively coupled to the circuit board 108 by an adhesion layer 88, e.g., a ring of solder or a suitable adhesive. The acoustic coupler 48 may define an acoustic chamber 114 between the circuit board 108 and waterpipe 18.

Figure 15:
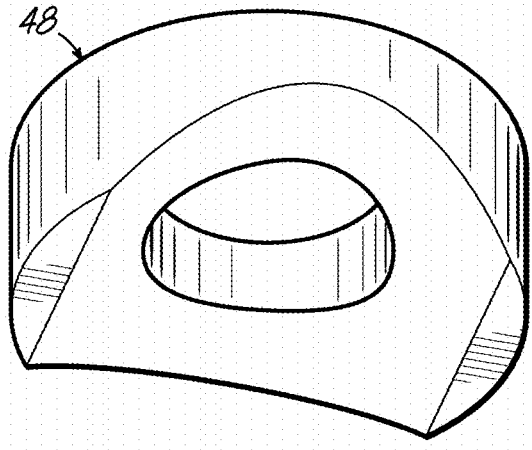
FIG. 15 is a perspective view of the acoustic coupler of FIG. 14.

FIG. 15 depicts an exemplary embodiment of the acoustic coupler 48. During installation on the waterpipe 18, an acoustic coupler 48 may be inserted between a pipe-facing surface of circuit board 108 and the outer surface of the waterpipe 18. The acoustic coupler 48 may improve acoustic coupling between the circuit board 108 and the curved outer surface of waterpipe 18. The acoustic chamber 114 defined between the circuit board 108 and waterpipe 18 may enhance acoustic coupling between the waterpipe 18 and the acoustic transducer 46 while reducing acoustic interference from sounds external to the waterpipe 18. Acoustic interference may be further reduced by filling the space around the circuit board 108 with an insulating material 116, e.g., fiberglass or foam insulation. Another layer of insulating material (not shown) may be wrapped around the outside the circuit board 108 to further reduce noise interference while also providing thermal isolation from the thermal flow sensor 40. The acoustic coupler 48 may be fabricated in different sizes through various approaches including three-dimensional printing, direct molding, injection molding, machining (such as milling), etc. The acoustic coupler 48 may be made from a flexible polymer (e.g., silicone) or any other suitable material depending on the fabrication technology in question.

Figure 16:
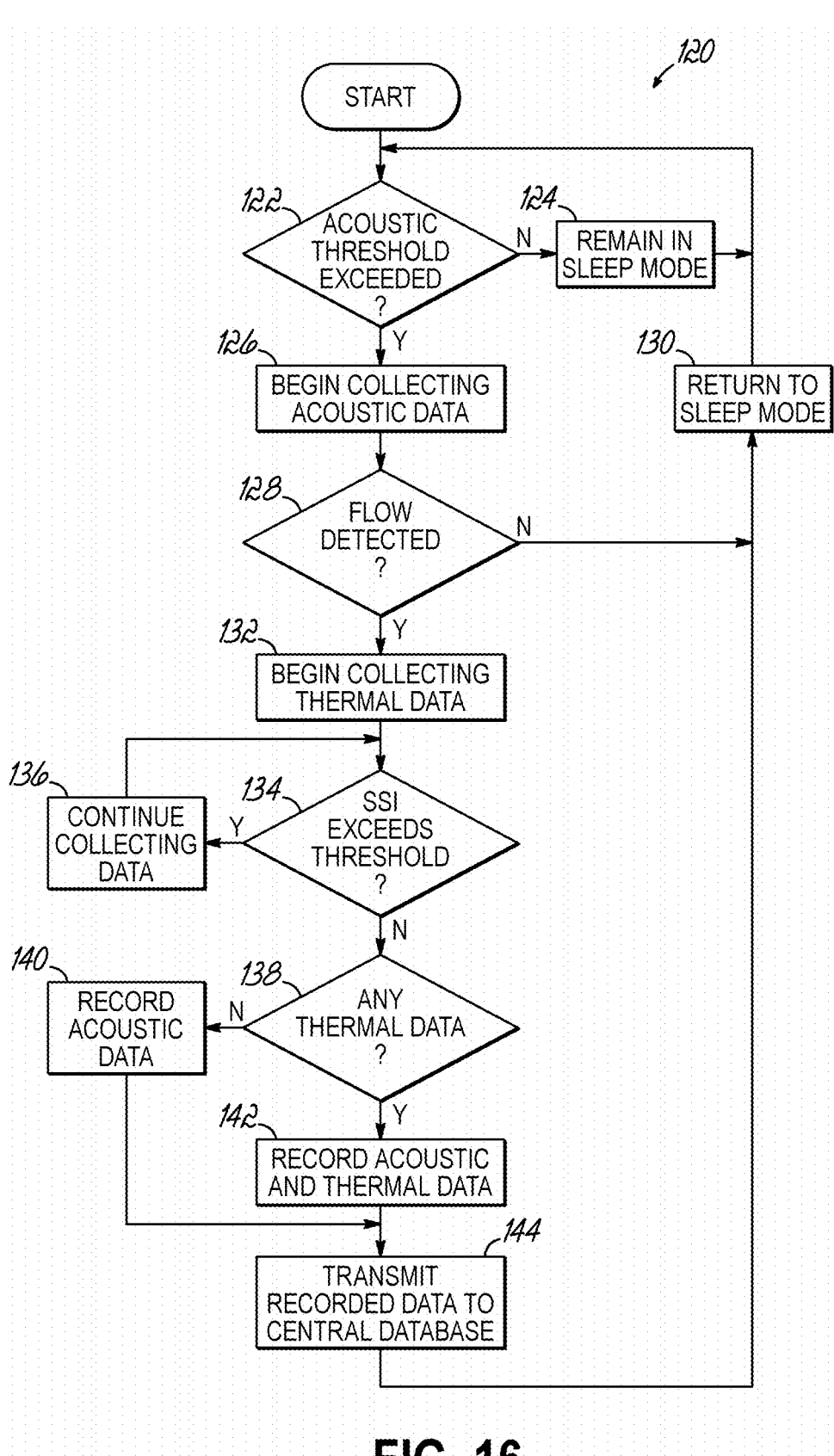
FIGS. 16 and 17 are flow charts illustrating processes that may be executed by the sensor module of FIG. 2 to detect waterflow in a waterpipe.

FIG. 16 depicts a flowchart illustrating a process 120 that may be implemented by the sensor module 12, or any other suitable element of the plumbing sensor system 10, to detect the flow of water through a waterpipe 18. In block 122, the process 120 may determine if an acoustic threshold has been exceeded, e.g., by comparing the output of the acoustic transducer 46 to a predetermined acoustic threshold. If the output of the acoustic transducer 46 does not exceed the acoustic threshold ("NO" branch of decision block 122), the process 120 may proceed to block 124, remain in sleep mode, and continue monitoring the output of the acoustic transducer 46. If the output of the acoustic transducer 46 does exceed the acoustic threshold ("YES" branch of decision block 122), the process 120 may proceed to block 126.

The acoustic threshold wake-up feature may be implemented by using an acoustic transducer 46 that includes a built-in function to generate a triggering signal. The triggering signal may be generated while the acoustic transducer 46 is in a low-power mode in response to the sound picked up by the acoustic transducer 46 exceeding a predefined acoustic threshold. This type of feature is provided by aforementioned PUI Audio PMM-3738-VM1010-R, for example. The triggering signal can be used to wake up or initiate operations at other components of the sensor module 12, such as a microcontroller unit 32. Both the acoustic transducer 46 and the microcontroller unit 32 may initially be in a low-power sleep mode to conserve power, and the trigger signal may be provided to a wakeup pin of the microcontroller unit 32.

In block 126, the process 120 may begin collecting acoustic data. For example, when sound exceeding the acoustic threshold is picked up by the acoustic transducer 46, the acoustic transducer 46 may transmit the trigger signal to the wake up pin on the microcontroller unit 32. In response to receiving the trigger signal at the wakeup pin, the microcontroller unit 32 may exit its low power sleep mode and begin receiving acoustic data. Acoustic data may be received in digital form directly from the acoustic transducer 46, or acoustic data may be received by sampling an analog output signal received from the acoustic transducer 46 and converting the samples to digital data indicative of the amplitude of the output signal versus time.

In block 128, the process 120 may determine if water is flowing based on the acoustic data. The microcontroller unit 32 may use a custom-designed acoustic flow detection algorithm to verify if the sound is caused by waterflow in the waterpipe 18. The acoustic flow detection algorithm may generate a signal strength indicator based on the acoustic data, and compare the signal strength indicator to one or more signal strength thresholds (e.g., the flow event start threshold) to determine if water is flowing. If waterflow is not detected ("NO" branch of decision block 128), the process 120 may proceed to block 130 and cause the sensor module 12 to return to sleep mode, e.g., by causing the microcontroller unit 32 and the acoustic transducer 46 to re-enter sleep mode. If waterflow is detected ("YES" branch of decision block 128), the process 120 may proceed to block 132.

In block 132, the process 120 may activate the thermal flow sensor 40 and begin collecting temperature data. Temperature data may be less susceptible to ambient conditions (e.g., noise), and thus provide higher detection accuracy than acoustic data. However, the thermal flow sensor 40 may also be inherently slower to respond to changes in water flow rate than the acoustic flow sensor 38, for example, due to the thermal masses involved and/or the speed at which heat propagates through the waterpipe 18 and/or water 56.

In block 134, the process 120 may continue to monitor the acoustic data to determine if the signal strength threshold (e.g., the event stop threshold) is being exceeded. If the signal strength threshold is being exceeded ("YES" branch of decision block 134), the process may proceed to block 136 and continue collecting thermal (and acoustic) data. Accordingly, as long as the flow event continues, the process 120 may repeatedly check the acoustic data (e.g., every t seconds) to determine that water is still flowing.

If the signal strength threshold is not being exceeded ("NO" branch of decision block 134), the process 120 may proceed to block 138 and determine if any temperature data has been collected. In some cases, the duration of the flow event may be too short to enable useful temperature data to be collected due to temperature data indicative of waterflow taking longer to collect than acoustic data. If no temperature data has been collected, or the temperature data collected is premature and thus unable to provide a reliable indication of the water flow rate ("NO" branch of decision block 138), the process 120 may proceed to block 140, and only record the acoustic data. If the temperature data has been collected, the process 120 may proceed to block 142 and record both the acoustic data and the temperature data. Recording data may include, for example, storing the data in a non-volatile memory of the sensor module 12.

In either case, the recorded data may include raw data (i.e., acoustic amplitude and/or temperature versus time data), processed data (i.e., flow rate data determined based on the raw acoustic and/or temperature data), or both raw and processed data. The process 120 may proceed to block 144 and transmit the recorded data to a central database (e.g., through the wireless network) before proceeding to block 130 and returning to sleep mode. Thus, if the temperature data based flow measurement has not been completed before flow of water stops, only the acoustic data may be recorded and transmitted to central database.

In an alternative embodiment of the invention, the microcontroller unit 32 and acoustic transducer 46 may operate continuously or wake up on a predefined schedule (e.g., every 0.25 sec). In this embodiment, decision block 122 may be eliminated (for continuous operation) or be replaced with a timer function (for periodic operation). In these alternative embodiments, the acoustic transducer 46 may transmit an acoustic signal to an always-on/periodically-on microcontroller unit 32 for processing with the custom acoustic flow detection algorithm. If the microcontroller unit 32 determines the received acoustic signal is indicative of waterflow, the process 120 may activate the thermal flow sensor 40, at which point the process 120 may continue in the same manner as described above. These alternative embodiments would not need an acoustic transducer 46 with the above described acoustic triggering function, and could thus operate with a less sophisticated analog or digital microphone.

Figure 17:
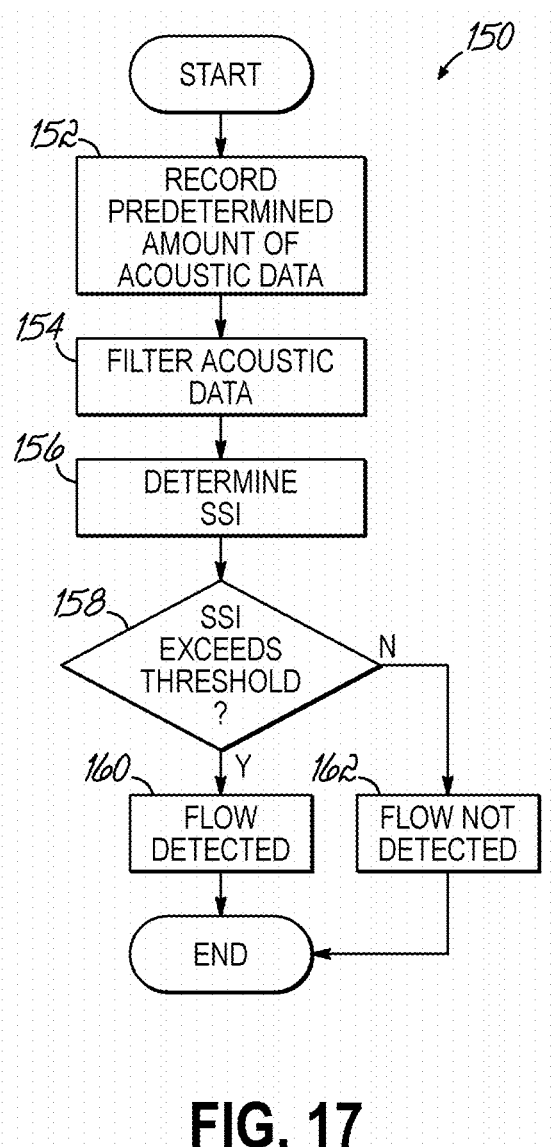

FIG. 17 depicts a flowchart illustrating an exemplary acoustic flow detection process 150 that may be implemented by the sensor module 12, or any other suitable element of the plumbing sensor system 10, to detect waterflow in block 128 and/or block 134 of process 120. In block 152, the process 150 may record a predetermined amount of acoustic data, e.g., 0.10 to 2.0 seconds of acoustic data. The acoustic data may be received directly from the acoustic transducer 46 (for acoustic transducers including an analog-to-digital converter) or may be generated by the microcontroller unit 32 sampling and digitizing an analog signal received from the acoustic transducer 46. In block 154, the process 150 may filter the recorded data using an acoustic noise filtering algorithm. The acoustic noise filtering algorithm may be configured to remove noise and/or interference components that are included in the acoustic data. Removing and/or reducing these components may improve the accuracy and/or reliability of the acoustic flow detection process 150 by, for example, increasing the signal-to-noise ratio of the signal strength indicator.

In block 156, the process 150 may process the filtered acoustic data using a signal strength indicator algorithm to generate a signal strength indicator based on the filtered acoustic data. The signal strength indicator may be indicative of how much acoustic energy in the acoustic data was generated by the flow of water. By way of example, the signal strength indicator algorithm may compare the filtered acoustic data to acoustic data known to be indicative of waterflow, and output a signal strength indicator having a value proportional to an amount of correlation between the two signals.

In block 158, the process 150 may compare the signal strength indicator to a predefined signal strength threshold. The predefined signal strength threshold may be selected depending on a state of the sensor module 12. For example, if an ongoing flow event is not in progress (i.e., at block 128 of process 120), the signal strength indicator may be compared to a flow event start threshold. In contrast, if an ongoing flow event is in progress (i.e., at block 134 of process 120), the signal strength indicator may be compared to a flow event stop threshold, which may be lower than the flow event start threshold.

If the signal strength indicator exceeds the signal strength threshold ("YES" branch of decision block 158), the process 150 may proceed to block 160 and determine that water is flowing through the waterpipe 18. If the signal strength indicator does not exceed the signal strength threshold ("NO" branch of decision block 158), the process 150 may proceed to block 162 and determine that water is not flowing through the waterpipe 18.

Thus, in an embodiment of the invention, whenever there is a sound that exceeds the predetermined acoustic threshold value, the acoustic transducer 46 may autonomously wake up the microcontroller unit 32. In response to being activated, the microcontroller unit 32 may record acoustic data received from the acoustic transducer 46. The recorded data may be processed by an acoustic flow algorithm which includes one or more signal filtering functions for the removal or reduction of noise and interference components as well as one or more waterflow detection functions that generate a signal strength indicator to compare with one or more signal strength threshold values. The signal strength threshold values may be determined from a sensor calibration process, or preset prior to installation of the sensor module 12. If the signal strength threshold exceeds one or more of the predetermined acoustic thresholds, the microcontroller unit 32 may determine water is flowing through the waterpipe 18, and activate the thermal flow sensor 40. If the signal strength threshold does not exceed one or more of the predetermined acoustic thresholds, the microcontroller unit 32 may determine water is not flowing through the waterpipe 18, and cause the sensor module 12 to reenter sleep mode.

In an exemplary embodiment of the acoustic flow algorithm, the data processing block of the acoustic flow algorithm may calculate the signal strength indicator using the filtered output from the pre-filtering block. A figure of merit (FOM), such as provided by Equation 1 below, may be used to quantitatively assess the efficiency of various algorithms and signal strength indicator methods in distinguishing between the water flow sound and surrounding noise, $$FOM = \frac{R(\text{water flow})}{A_1 R(\text{noise}_1) + A_2 R(\text{noise}_2) + \ldots + A_n R(\text{noise}_n)} \quad \text{Eqn. 1}$$

where R(waterflow) and R(noise$_x$) are the outputs of the detection algorithm applied to water flow sound only or noise only (respectively), and A$_1$, A$_2$, etc. are weighting factors of different noise types.

The figure of merit provided by Equation 1 may be the ratio of the output of the acoustic flow algorithm for water flow sound detection to that of noise signals, which can be either a standard average or a weighted average of various noise types. A higher figure of merit may signify a greater capacity of the algorithm to differentiate water flow sound from noise. Exemplary signal strength indicators include, but are not limited to, root-mean-square (RMS) power, which can be determined by:

$$R\_rms(x) = \frac{1}{n} \sum_{k=1}^{n} x(n)_k^2$$

energy, which can be determined by:

$$R\_eng(x) = \sum_{n=0}^{N} |x(n)|^2$$

and amplitude, which can be determined by:

$$R\_amp(x) = \sum_{n=0}^{N} |x(n)|$$

Based on experimental evaluations, amplitude was chosen as the signal strength indicator calculation method for the experimental results provided below. The post-filtering block may perform additional filtering of the signal strength indicator data to remove spikes and noise. The signal strength indicator may be compared to predefined thresholds in the comparator block to determine waterflow events. The comparator block may use configurable waterflow on and off thresholds with hysteresis to compensate for any noise in the input signal from the post-filtering block.

Experimental Results

Sensor Module

Figures 18, 19, 20:
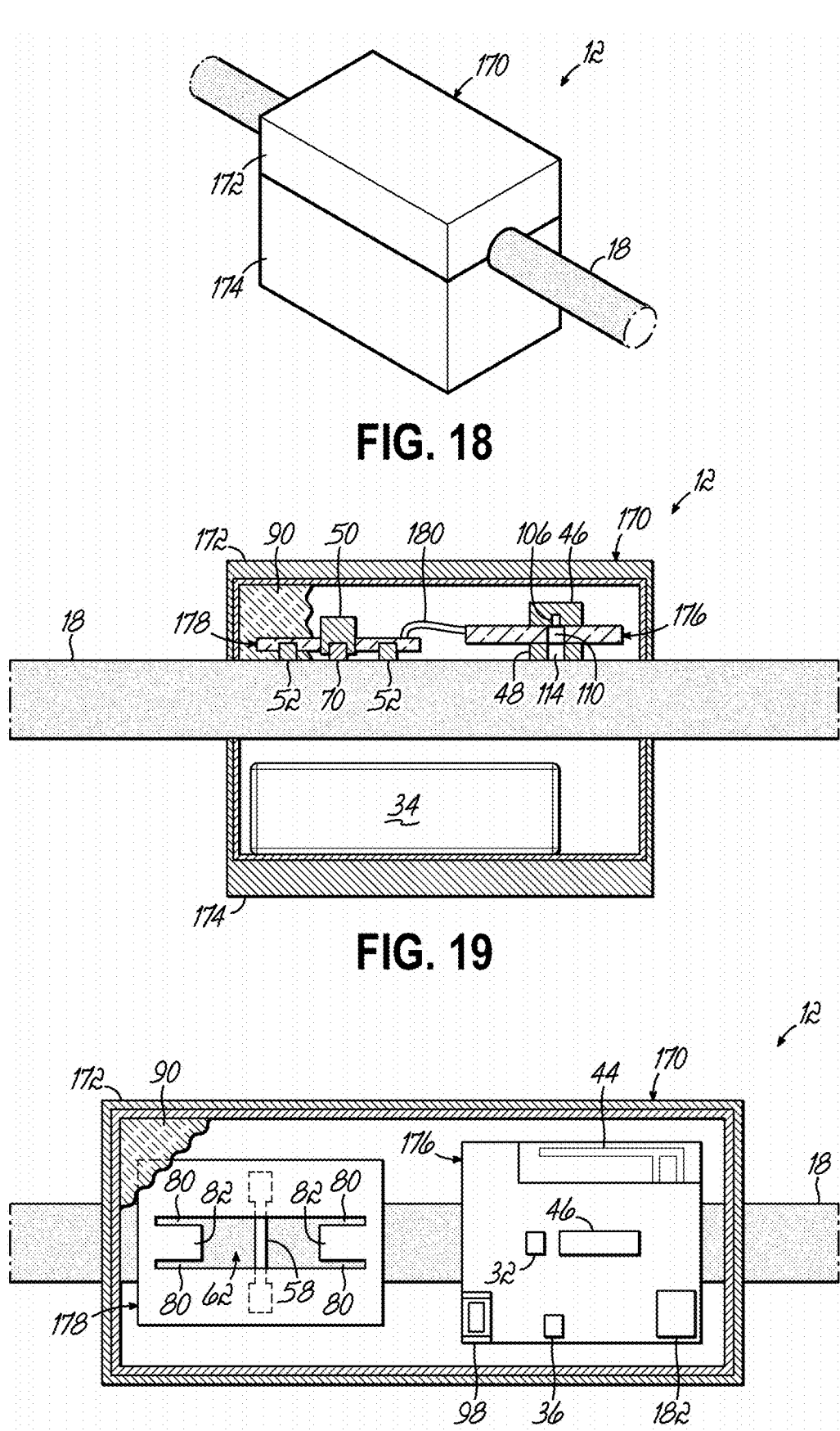
FIG. 18 is a perspective view of the housing of an exemplary prototype sensor module used to collect experimental data.
FIG. 19 is a cross-sectional view of the prototype sensor module of FIG. 18 operatively coupled to a waterpipe.
FIG. 20 is a diagrammatic top view of an upper portion of the housing of FIG. 18 including a main circuit board and an expansion circuit board.

FIGS. 18-20 depict an exemplary prototype sensor module 12 used to collect experimental data during proof-of-concept testing. The prototype sensor module 12 includes a housing 170 having an upper portion 172 and a lower portion 174. The upper portion 172 and lower portion 174 of housing 170 may be joined together with fasteners (e.g., nuts and bolts—not shown) to secure the sensor module 12 to the waterpipe 18. The prototype housing 170 was fabricated using a three-dimensional printer, although any suitable material and/or means of fabrication could have been used.

The depicted sensor module 12 further includes a main circuit board 176 and an expansion circuit board 178 that are connected by a ribbon cable 180. The main circuit board 176 includes the microcontroller unit 32, power supply 36, antenna 44, acoustic transducer 46, a heater driver 98, and a connector 182, e.g., a micro universal serial bus (USB) connector. The connector 182 may enable the power source 34 to be charged without removing it from the housing 170. The upper portion 172 of housing 170 is filled with an insulating material 90 to isolate the circuit boards 176, 178 thermally and acoustically from each other and the housing 170. The acoustical isolation provided by the insulating material 90 may reduce the impact of ambient noise on the acoustic flow sensor 38.

The temperature sensors 52 are located on the expansion circuit board 178 to thermally isolate them from heat generated by the main circuit board 176, and to prevent heat from the main circuit board 176 from affecting operation of the thermal flow sensor 40. The acoustic coupler 48, main circuit board 176, and expansion circuit board 178 are located in the upper portion 172 of housing 170, and the power source 34 (e.g., a 5 volt battery pack with 10,000 mAh capacity) is located in the lower portion 174 of housing 170. The acoustic coupler 48 comprises a flexible coupling ring that is placed between the waterpipe 18 and the main circuit board 176. The acoustic coupler 48 thereby defines an acoustic chamber 114 surrounding the through hole 110 of main circuit board 176, minimizes infiltration of environmental noise, and maximizes the coupling of sound emitted from the waterpipe 18 to the acoustic transducer 46.

Figure 21:
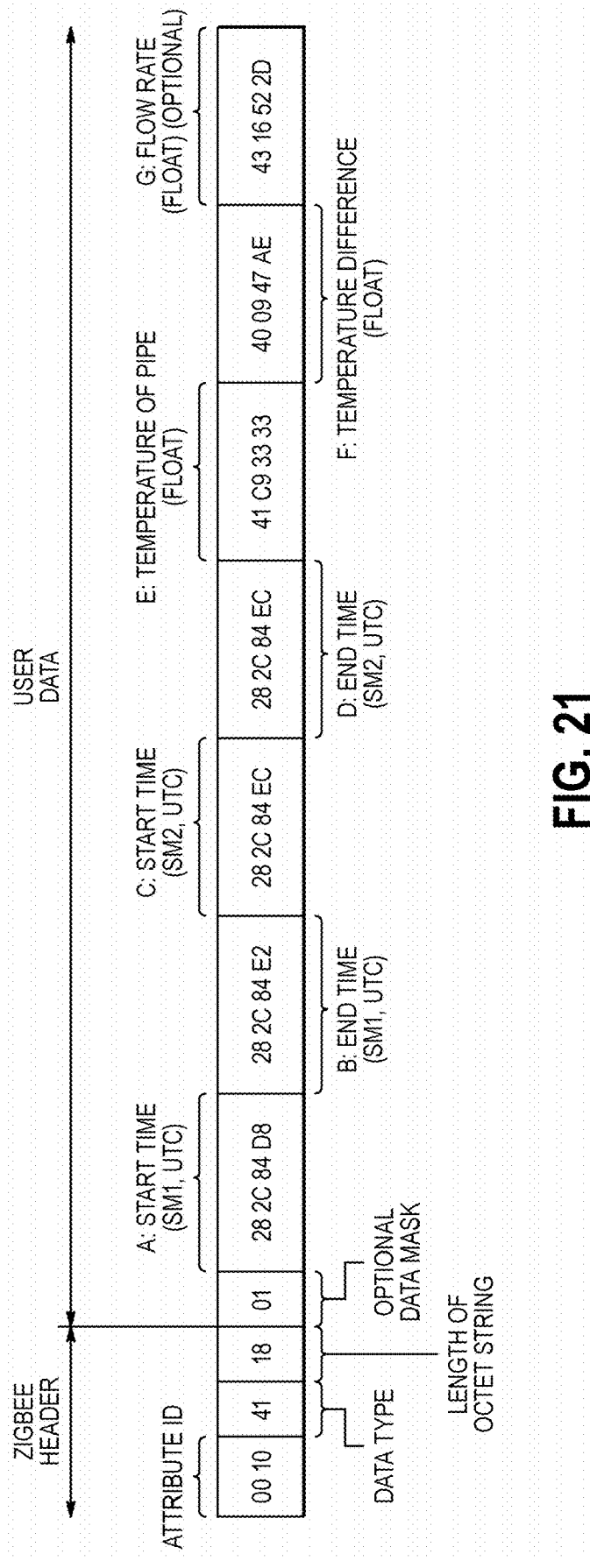
FIG. 21 is a diagrammatic view of a data packet that may be transmitted by the sensor module.

The wireless performance of the sensor module 12 was tested by sending dummy data to the wireless network gateway 22. The test results indicate that the wireless link has reliable transmissions for a range of up to 36 meters without intervening obstacles, and a range of up to 26 meters with one intervening obstacle, e.g., a metal door. FIG. 21 depicts the structure of an exemplary Zigbee-compatible data frame that may be wirelessly transmitted from the sensor module 12 to the wireless network gateway 22 for each flow event detected. The data frame starts with the Zigbee header which is the intrinsically defined for ZigBee data frames. This is followed by the user data, which includes the results from both the acoustic flow sensor 38 and the thermal flow sensor 40. The first byte in the user data is an optional data mask, which is used as an identifier for any optional data that may be present in the data frame. The next 8 bytes are the start and stop timestamps of the flow event detected by the acoustic flow sensor 38 (A and B in FIG. 21), which is followed by the start and stop timestamps detected by the thermal flow sensor 40 (C and D in FIG. 21). These are followed by the temperature of the waterpipe 18

(E) and the temperature difference (F) measured by the thermal flow sensor 40. Finally, there is an optional field for flow rate data (G).

Figures 22, 23, 24:
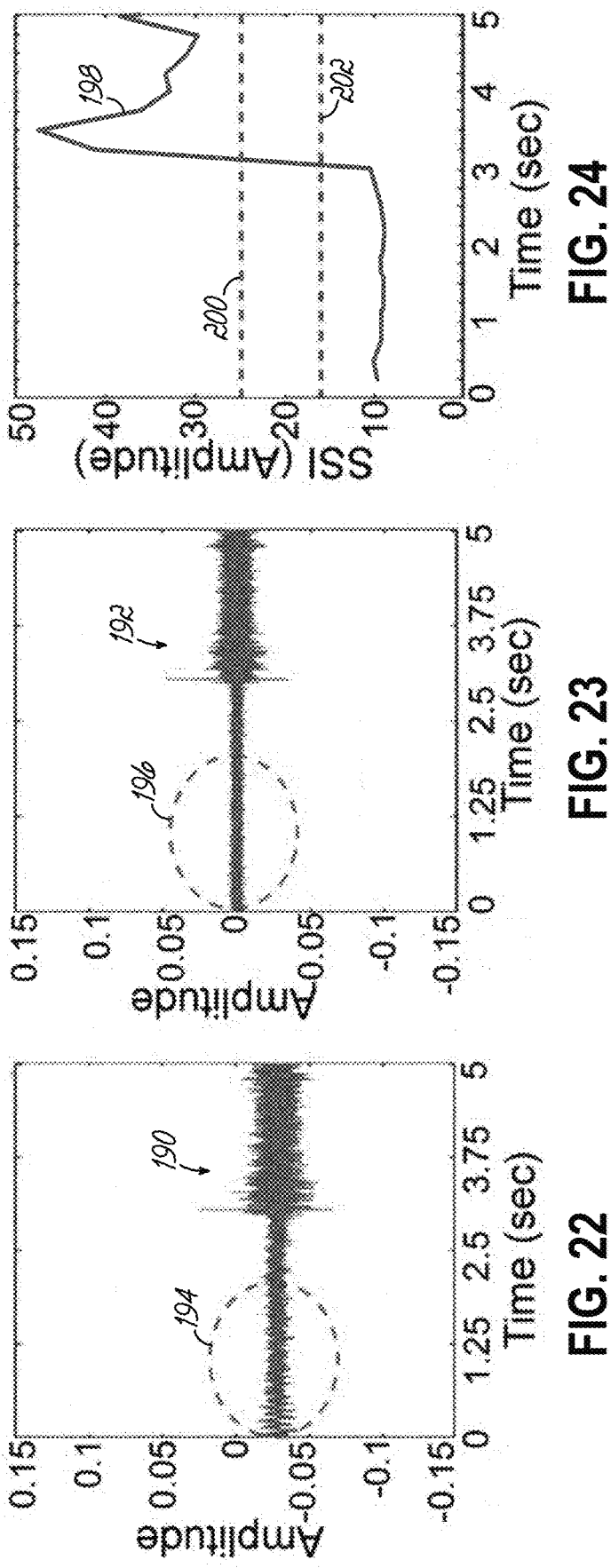
FIG. 22 is a graphical view showing an exemplary acoustic signal prior to noise filtering.
FIG. 23 is a graphical view showing the exemplary acoustic signal of FIG. 21 after noise filtering.
FIG. 24 is a graphical view showing a signal strength indicator generated from the filtered acoustic signal of FIG. 22.

Field tests were performed to verify functionality of the prototype sensor module 12 by deploying the prototype sensor module 12 in a restroom of a cafeteria in an on-campus residence building. FIGS. 22 and 23 depict time-domain plots 190, 192 of acoustic data (as a time domain signal) including a water turn-on event. Plot 190 of FIG. 22 shows the acoustic data before filtering by the acoustic noise filtering algorithm, and plot 192 of FIG. 23 shows the acoustic data after filtering by the acoustic noise filtering algorithm. Comparing the sound levels in respective pre-flow regions 194, 196 of the plots 190, 192 demonstrates the reduction in noise levels achieved. The acoustic noise filtering algorithm effectively reduces background noise, thereby improving the reliability of waterflow detection. By way of example, a total of 275 water on-off cycles were detected by the sensor module 12 during a 24-hour period during testing.

FIG. 24 depicts a plot 198 of the amplitude of the signal strength indicator verses time for the acoustic data of FIG. 23. An upper dashed line 200 indicates the flow event start threshold, and the lower dashed line 202 indicates the flow event stop threshold. As described above, the sensor module 12 may be configured to detect the start of a waterflow event in response to the signal strength indicator rising above the flow event start threshold, and to indicate the end of the waterflow event in response to the signal strength indicator dropping below the flow event stop threshold. The vertical separation of the start and stop thresholds provides an amount of hysteresis to prevent unwanted rapid switching between an indication of waterflow and an indication of no waterflow when the signal strength indicator is near either threshold.

A preliminary overall system test of a prototype system was performed to verify functionality of the plumbing sensor system 10. A wireless network gateway 22 using the Zigbee communication protocol was deployed with two prototype sensor modules 12. Each sensor module 12 was mounted on a respective half-inch copper waterpipe 18 proximate to a regular water faucet. One of the sensor modules 12 was located three meters from the wireless network gateway 22, and the other sensor module 12 was located 18 meters from the wireless network gateway 22. Both the acoustic and thermal sensing modalities in the sensor module 12 were tested concurrently for waterflow detection. The data was wirelessly recorded into the wireless network gateway 22 and downloaded through a user interface on a web application. A subset of the recorded flow events with timestamps are listed as examples in Table III. A delay of 0-3 sec was observed between the event timestamps generated by the acoustic flow sensor 38 and thermal flow sensor 40. This delay is expected and considered acceptable. The prototype plumbing sensor system 10 was successfully verified for its operation and functions for the intended application.

TABLE III

| | | Experimental Recorded Flow Events with Timestamps | | | |
|---|---|---|---|---|---|
| Event | Location | Acoustic Sensor Timestamp | | Thermal Sensor Timestamp | |
| 1 | 1 | 0 | 103 | 1 | 103 |
| 2 | 1 | 200 | 303 | 202 | 303 |

TABLE III-continued

| | | Experimental Recorded Flow Events with Timestamps | | | |
|---|---|---|---|---|---|
| | | Acoustic Sensor | | Thermal Sensor | |
| Event | Location | Timestamp | | Timestamp | |
| 3 | 1 | 400 | 502 | 401 | 503 |
| 4 | 1 | 600 | 702 | 603 | 702 |
| 5 | 1 | 800 | 903 | 802 | 903 |
| 6 | 1 | 1000 | 1103 | 1003 | 1103 |
| 7 | 1 | 1200 | 1303 | 1201 | 1303 |

Figure 25:
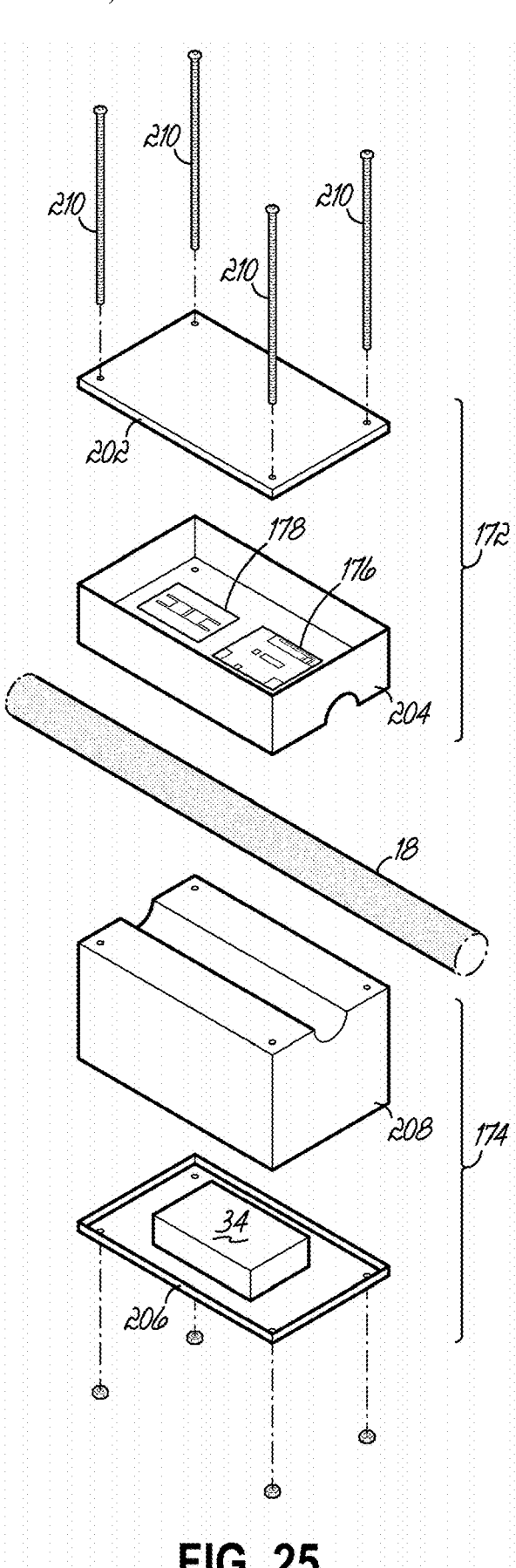
FIG. 25 is an exploded view of an alternative embodiment of the protype sensor module of FIGS. 18-20 in which the upper and lower portions of the housing each include a cover and a case.

FIG. 25 depicts an alternative embodiment of the prototype sensor module 12 in which the upper portion 172 of housing 170 includes a cover 202 and a case 204, and the lower portion 174 of housing 170 includes a cover 206 and a case 208. Each of the covers and cases may be held together by fasteners 210 to facilitate the installation of the sensor modules 12 on the waterpipe 18 at test sites. This depicted embodiment is one possible design of the sensor module 12 that may be used to facilitate integration all the elements of the sensor module 12 and coupling of the sensor module 12 to a waterpipe 18 with an efficient and quick deployment process. In yet another embodiment, the power source 34 may be located externally to the housing 170, which could allow the size of the housing 170 to be reduced significantly.

Thermal Flow Sensor

Figure 26:
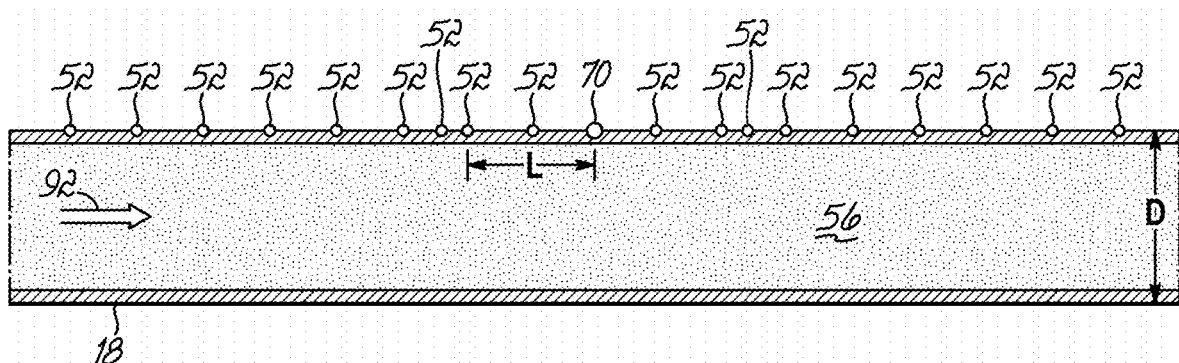
FIG. 26 is a cross-sectional view of a computer model of a waterpipe used to simulate operation of the thermal flow sensor.

Operation of the thermal flow sensor 40 was simulated using COMSOL Multiphysics®, which is a physics-based modeling and simulation software platform that can be obtained from COMSOL, Inc. of Burlington, Massachusetts. The heat transfer in solids and fluids and the laminar flow modules were used to simplify the simulation even though waterflow in waterpipes is typically turbulent. FIG. 26 depicts a computer model of the waterpipe 18 which was provided to the COMSOL simulation. The waterpipe dimensions were that of a standard D=¾ inch copper waterpipe. The distance L between the virtual heating element 70 and temperature sensors 52 is a design parameter that may affect the efficiency of thermal coupling through the wall of waterpipe. Simulations were performed for a series of L values to find the maximum temperature difference $T_A$ between the two temperature sensors 52 in the presence of flowing water 56. The conditions of the simulations are summarized in Table IV below.

TABLE IV

| COMSOL Simulation Conditions for L Optimization | |
|---|---|
| Parameter | Value |
| In-flow Water Temperature | 300 K |
| Ambient Temperature | 295.15 K |
| Copper Pipe Type/Wall Thickness | US ¾ inch K-type pipe/1.65 mm |
| Copper Heat Capacity | 385 J/kg*K |
| Copper Density | 8960 kg/m³ |
| Copper Thermal Conductivity | 400 W/m*K |
| Copper Surface Emissivity (Measured) | 0.59 |
| Heater Power | 1.5 W |
| Water Flow Rate | 0.315 L/s (4.99 GPM) |

Figure 27:
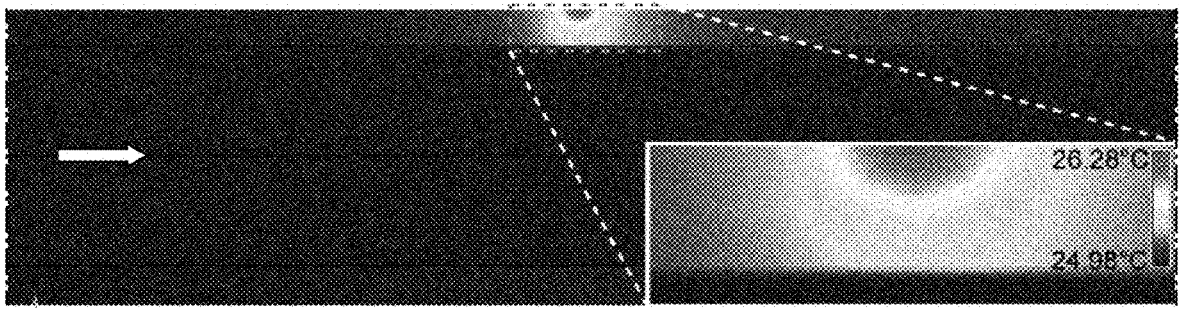
FIG. 27 is a graphical view of a simulated temperature gradient of the computer model of FIG. 26.

The surface emissivity of the copper pipe used in the later experiments was found using an infrared thermometer and used in the simulations. FIG. 27 depicts a typical simulated temperature gradient based on the above simulation parameters. As can be seen, the temperature gradients on the upstream and downstream sides of the heater element 70 are asymmetric.

Figure 28:
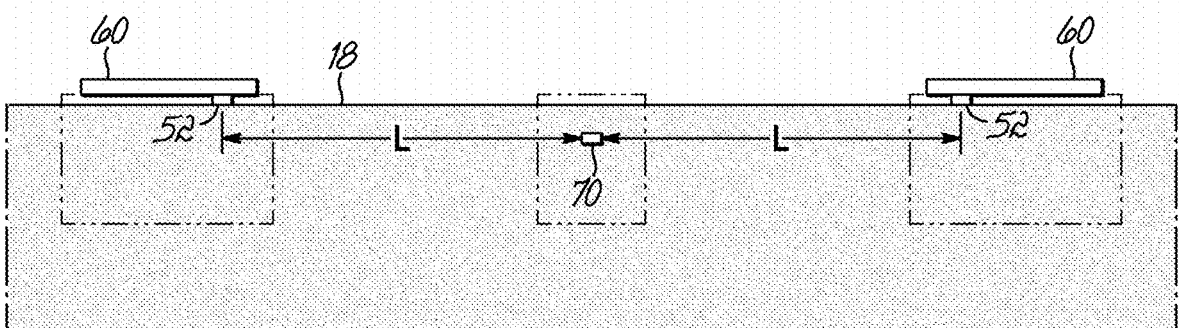
FIG. 28 is a diagrammatic view of an exemplary test setup for measuring an optimal distance between a heater element and temperature sensors of FIG. 26.

FIG. 28 depicts a test setup 216 used for testing the above described prototype thermal flow sensor 40 on a ¾ inch K-type U.S. standard copper waterpipe connected to a city water supply line. A series of experiments were performed for the optimization of the distance L using the test setup 216.

Figure 29A:
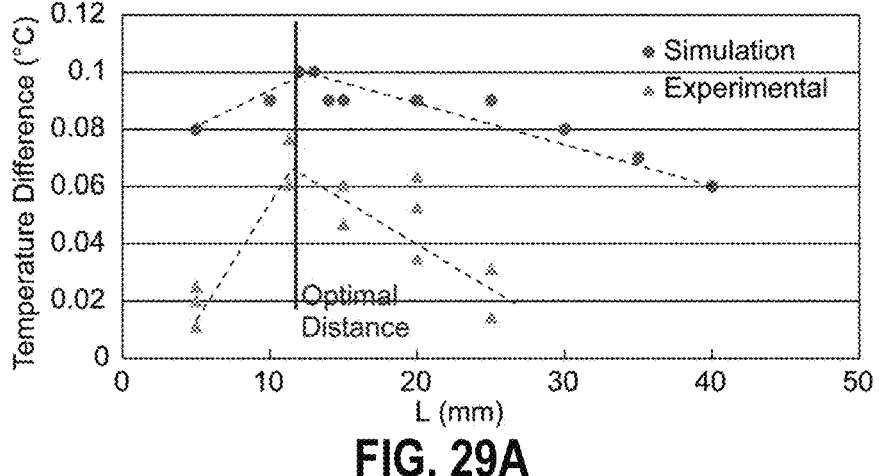
FIG. 29A is a graphical view of temperature data verses distance between the temperature sensors and the heating element for both the simulated model of FIG. 26 and the test setup of FIG. 28.

FIG. 29A depicts plots of the temperature difference $T_A$ for different distances L between temperature sensors 52. The distance L was optimized by finding the distance L that provided the largest temperature difference $T_A$, which indicates maximum thermal coupling between the heating element 70 and the water 56 through the wall of waterpipe 18. In this exemplary embodiment, the optimal distance L was approximately 12 mm. This value is compared with experimental optimization results described below.

Figure 29B:
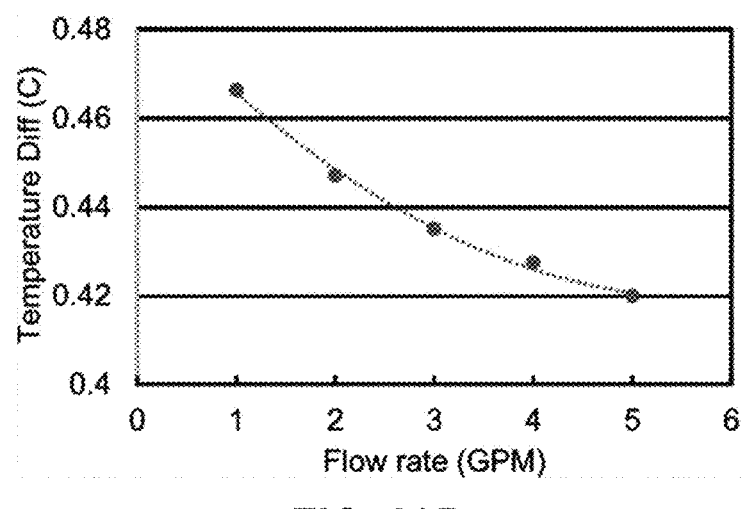
FIG. 29B is a graphical view of simulated temperature difference versus water flow rate for a computer model of the thermal flow sensor.

In addition to identifying the optimal distance L between the heating element 70 and temperature sensors 52, further simulations were conducted to study the effect of flow rate on the temperature difference $T_A$ at the optimal distance L. For the sake of simplification, a two-dimensional geometry was employed to model waterflow within water pipe 18. The model incorporated a small boundary heat source with an area matching that of the heating element 70 utilized in subsequent experiments. The heat transfer in solids and fluids and the turbulent flow physics module was utilized for studying the designed simulation. The temperature difference $T_A$ was obtained and plotted for a series of flow rates. FIG. 29B depicts a graph showing the temperature difference $T_A$ predicted by the COMSOL simulation, which indicates an inversely decaying trend with respect to the flow rate. The observed trend is compared to experimentally obtained data below.

Figures 29C, 29D, 29E:
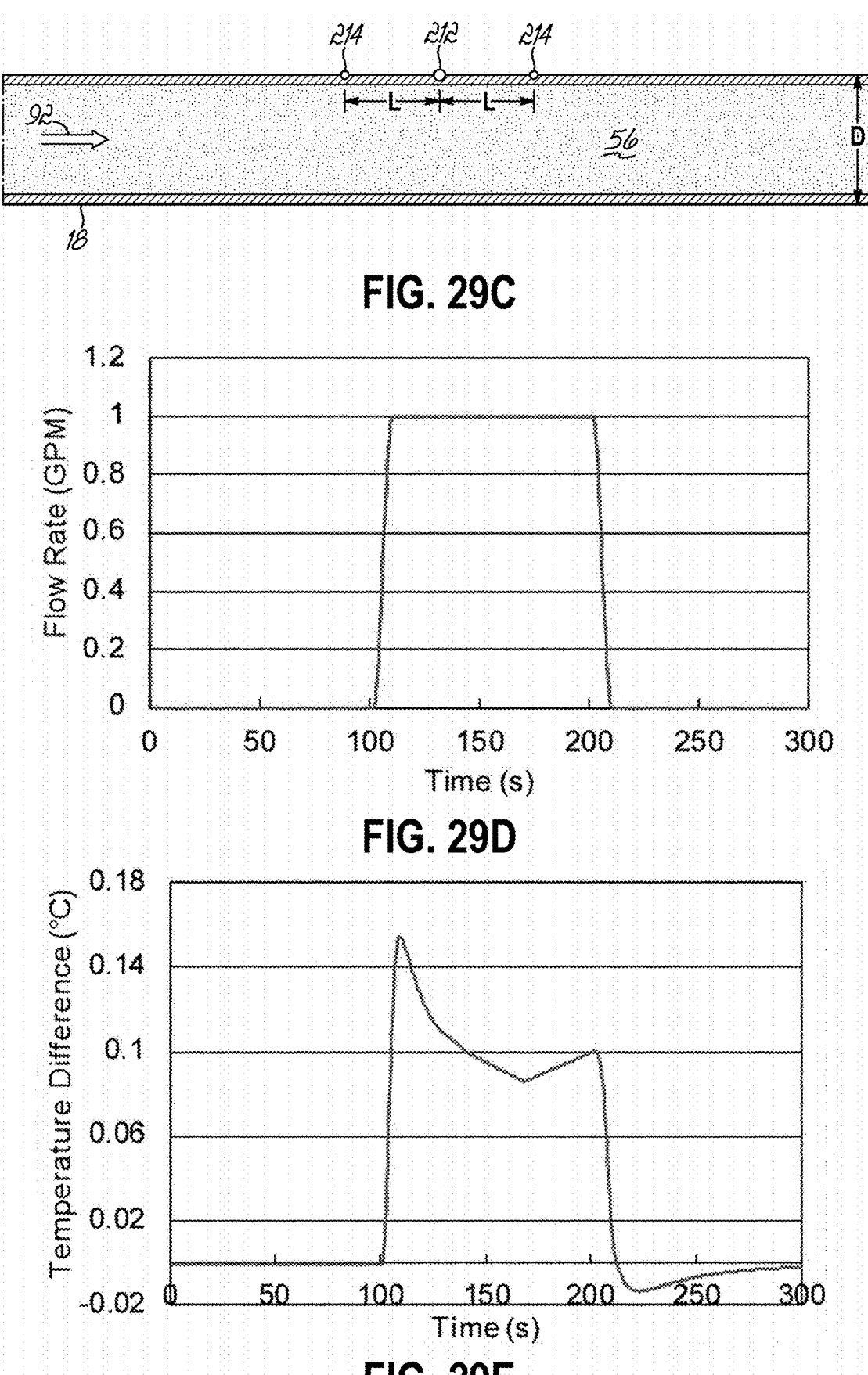
FIG. 29C is a schematic view of the computer model used for the simulation of FIG. 29B
FIG. 29D is a graphical view of flow rate versus time used as input for the transient simulation of FIG. 29C.
FIG. 29E is a graphical view of temperature difference versus time generated from the transient simulation of FIG. 29C.

A COMSOL Multiphysics model was created to study the transient behavior of the proposed sensor design during waterflow events. FIG. 29C depicts a model used for the simulation that includes a copper water pipe 18 having an outside diameter D=21.3 mm, a heater site 212 on the outer surface of the water pipe 18, and two temperature sites 214 each on the outer surface of the pipe 18 and located at a distance L=12 mm from the heater site 212. The depicted model is a two-dimensional geometric configuration employing the laminar flow module (utilized for simplification) and the heat transfer in solids and fluids module. The waterflow (as indicated by single headed arrow 92) was modelled as a step input as shown in FIG. 29D. The depicted step input has no flow during the first 100 seconds, increases to a flow rate of one gallon per minute (GPM) after 110 seconds, and decreases to zero gallons per minute after 200 seconds with a transition time of 10 seconds. The observed temperature difference $T_A$ as a function of time is plotted in FIG. 29E and is compared with the experimental results below.

Figure 29F:
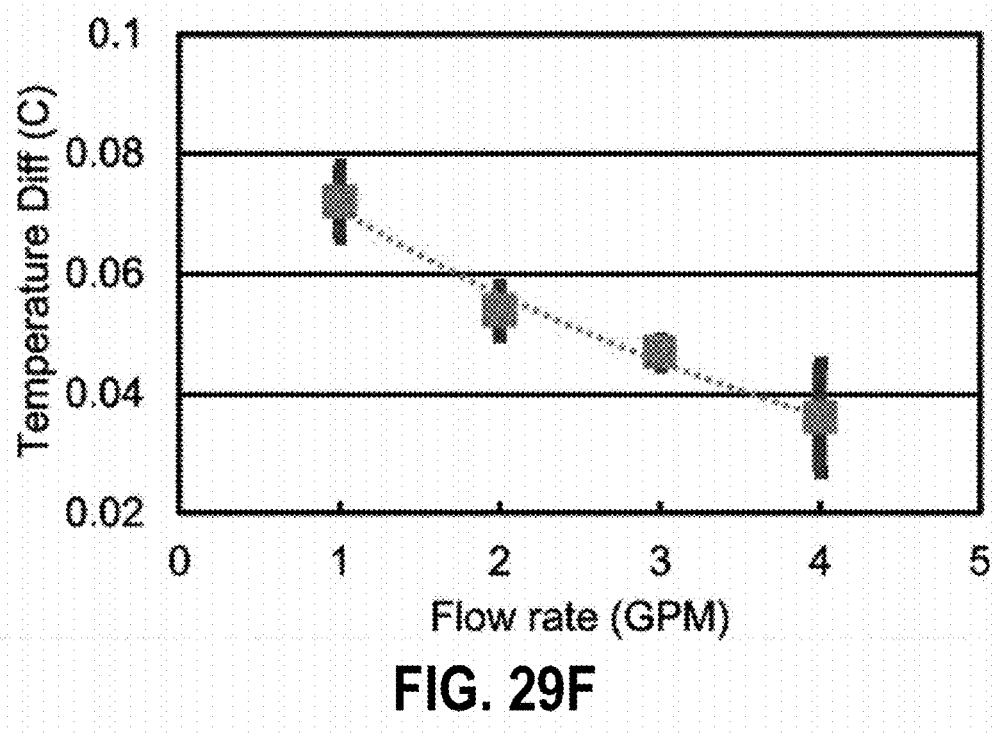
FIG. 29F is a graphical view of temperature difference versus flow rate obtained from experiments using a setup shown in FIG. 28.
Figure 29G:
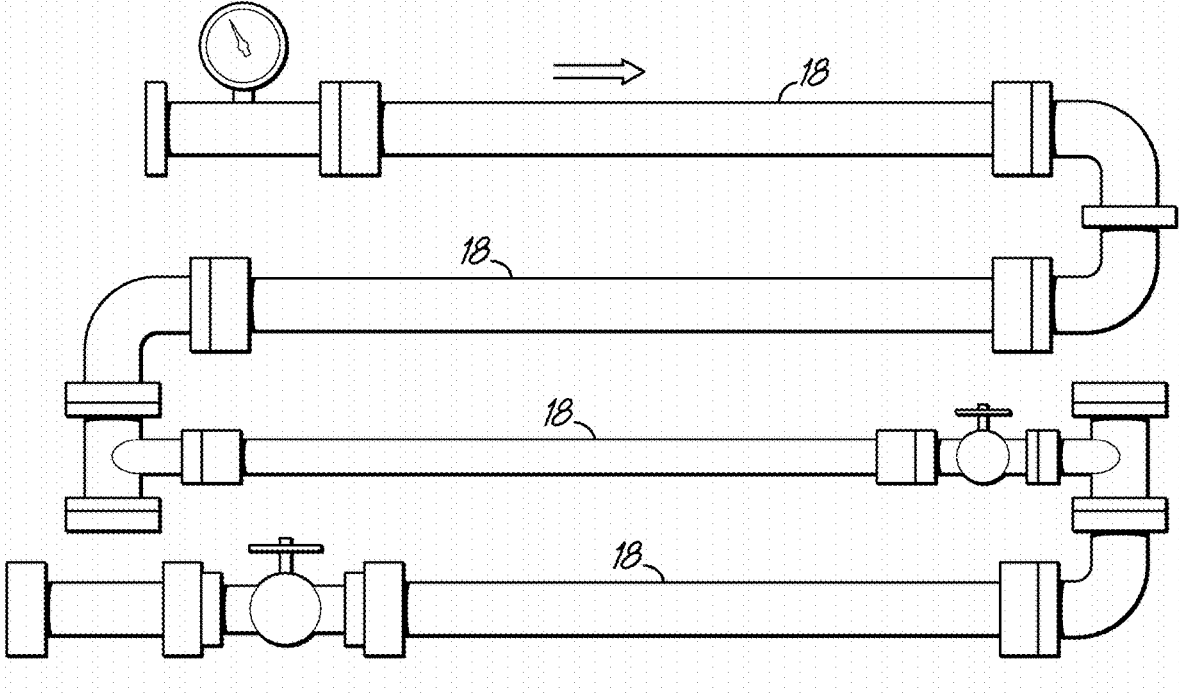
FIG. 29G is a schematic view of a test setup for generating experimental data to test the simulated results generated by the computer model of FIG. 29C.

The designed sensor was tested for its response at different flow rates using the setup described above. An optimal distance L was calculated using experiments and simulations, and this distance L used as the distance between the temperature sensors 52 and the heating element 70. The flow rate was varied and the temperature difference $T_A$ during waterflow recorded and averaged for multiple on/off cycles. FIG. 29F plots the temperature difference $T_A$ recorded during experiments against flow rate. The trend observed from the experiments matches well with the expectation from the simulations. FIG. 29G depicts a simplified schematic of a test setup used to generate experimental data.

A prototype thermal flow sensor 40 was fabricated using Maxim MAX30208CLB+ digital temperature sensors for the temperature sensors 52. The MAX30208CLB+ is available from Analog Devices of Wilmington, Massachusetts, and has a resolution of 0.005° C. and a contact area of 2×2 mm². The circuit board 60 was custom designed and optimized for symmetric heat conduction. The heater bridge 58 and sensor mount 64 were fabricated by three-dimensional printing using a Form 3 high precision printer, which is available from Formlabs of Summerville, Massachusetts. The three-dimensional printing was based on stereolithography technology, and high temperature resin was used for printing both the heater bridge 58 and sensor mount 64. The heating element 70 was fabricated by winding insulated nichrome (NiCr) wire having a 50 μm diameter onto the projection 74 of heater bridge 54 using a custom-built wire-winding machine. The fully assembled thermal flow sensor 40 was configured for deployment on a ¾ inch copper waterpipe, and had a length of about 40 mm and inner diameter of about 22 mm.

Figure 30:
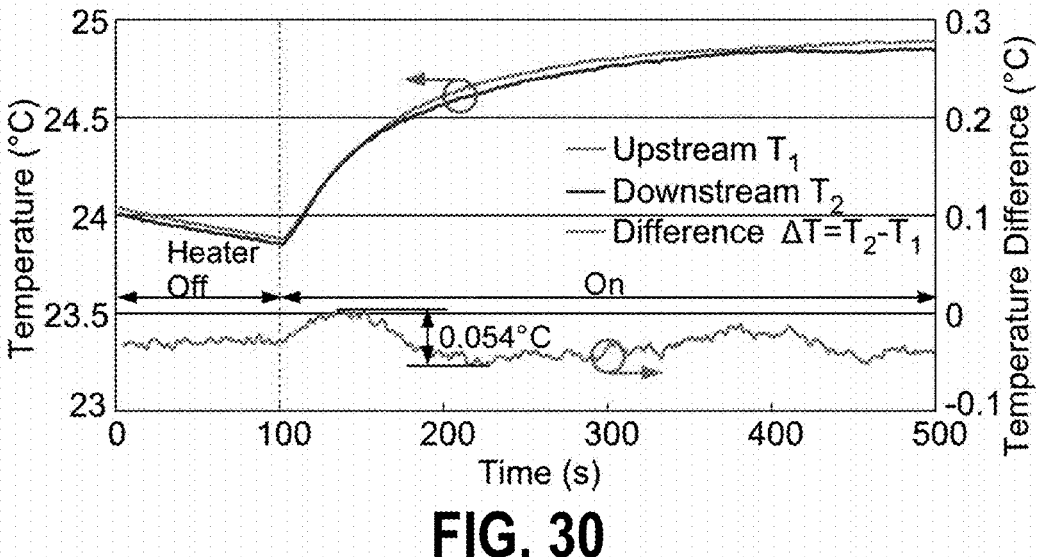
FIG. 30 is a graphical view of temperature readings from each of the temperature sensors of the test setup of FIG. 28.

The symmetry of heat conduction from the heating element 70 was evaluated while the prototype thermal flow sensor 40 was mounted on the copper waterpipe 18. The heater 50 was activated with non-flowing water 56 in the waterpipe 18, and temperature data recorded. FIG. 30 depicts a graph including plots of temperature readings from each of the temperature sensors 52. As can be seen, the temperatures $T_1$, $T_2$ of both temperature sensors 52 consistently increase in response to the heater 50 being activated. The temperature difference $T_A$ remains stable within a small range of temperatures (e.g., 0.05° C.), indicating excellent symmetry of heat conduction from the heating element 70.

Figure 31:
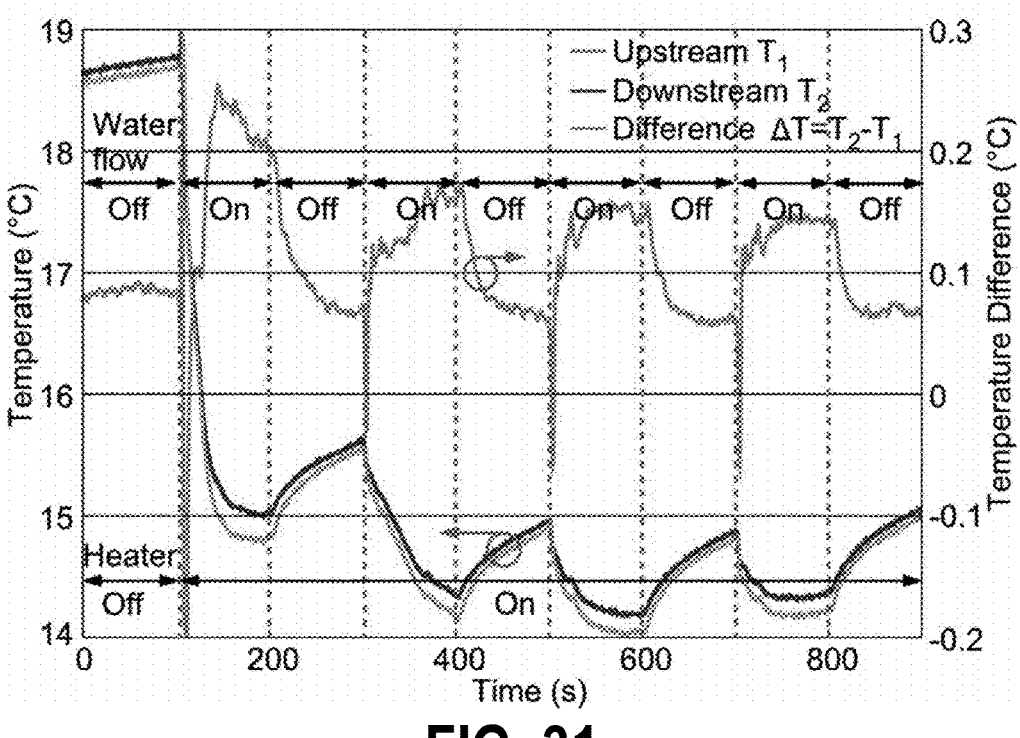
FIG. 31 is a graphical view of temperature readings of the test setup of FIG. 28 with the waterflow repeatedly turned on and off.

The prototype thermal flow sensor 40 was deployed for flow event detection. The heater 50 was activated and waterflow through the waterpipe 18 turned on and off repeatedly to emulate water usage events at a fixture 16. FIG. 31 depicts a graph including plots of the recorded temperature readings and calculated temperature difference $T_A$, both of which show a clear pattern following the water on/off events with negligible delay. Accordingly, the test results indicate successful device operation and verify the principle and functions of the thermal flow sensor 40. A thermal flow detection algorithm may be used to analyze the pattern of temperature differences $T_A$ versus time for automated recording of the water on/off events in the microcontroller unit 32. The thermal flow detection algorithm may use curve smoothening and first order derivatives to quantify a water flow rate through the waterpipe 18 based on temperature difference $T_A$.

Figures 32, 33, 34:
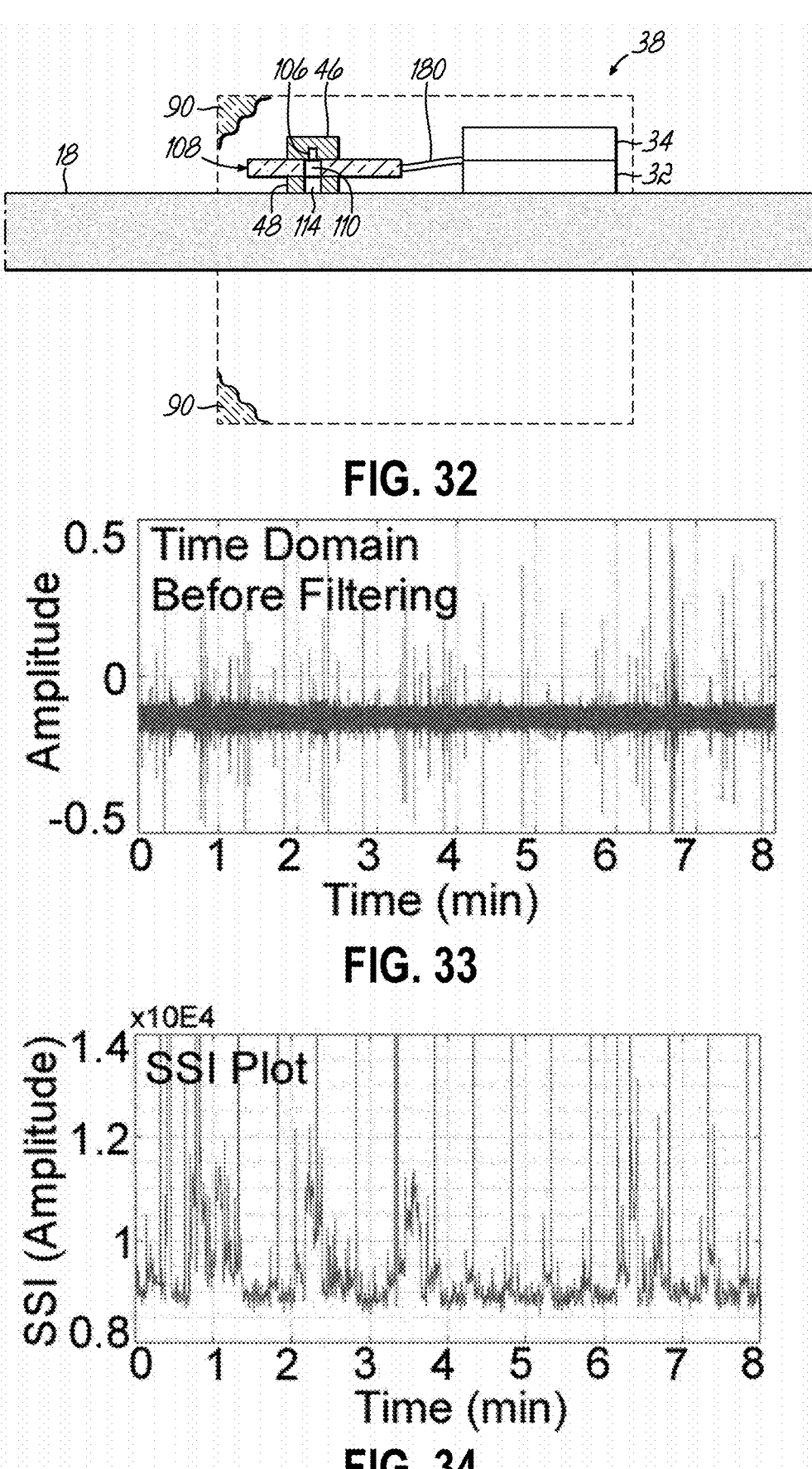
FIG. 32 is a schematic view of a test configuration for testing an acoustic flow sensor.
FIG. 33 is a graphical view of a segment of raw acoustic data collected by the acoustic flow sensor of FIG. 32.
FIG. 34 is a graphical view of a signal strength indicator determined from the raw acoustic data of FIG. 33.

FIG. 32 depicts a test configuration for a stage-one field trial of an exemplary acoustic flow sensor 38. The acoustic flow sensor 38 was placed on a water pipe 18 to collect acoustic data at the deployment site. The acoustic transducer 46 was connected to the microcontroller unit 32 (e.g., a Raspberry Pi) using a printed circuit board 108. An acoustic coupler 48 in the form of a 3D printed coupling ring was utilized to attach the acoustic transducer 46 to a ½ inch copper pipe while the acoustic transducer 46 was attached to the printed circuit board 108. Insulating material 90 (e.g., fiberglass insulation) was packed around the water pipe 18, microcontroller unit 32, power source 34, and acoustic transducer 46. The microcontroller unit 32 collected and stored acoustic data from the acoustic transducer 46 continuously during the field test. The collected data was processed in MATLAB to verify the efficiency of the developed algorithm.

Figure 35:
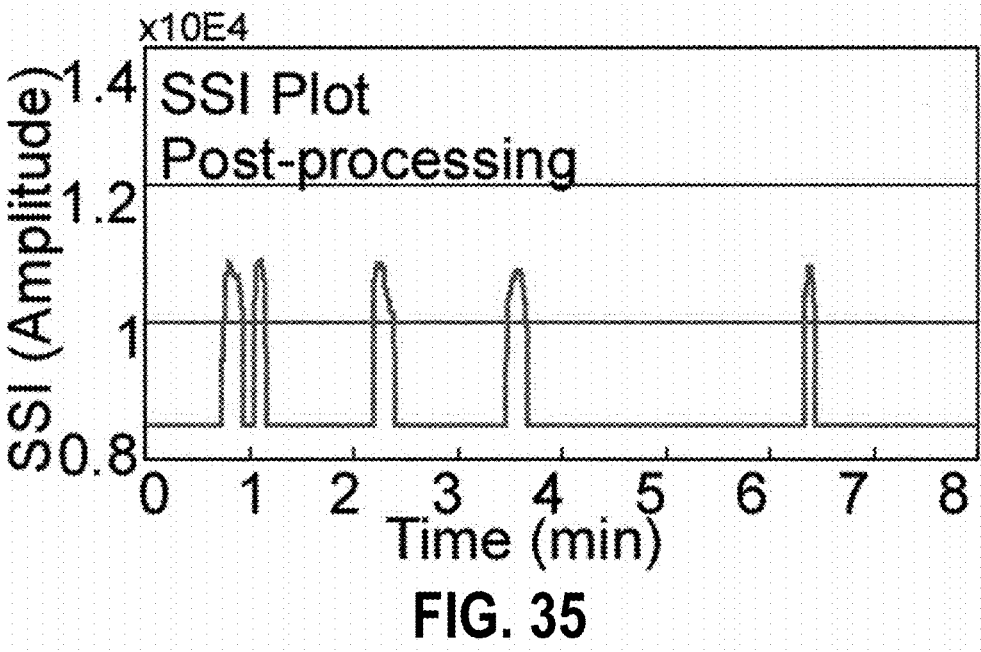
FIG. 35 is a graphical view of a cleaned signal strength indicator signal generated by filtering the signal strength indicator of FIG. 34.
Figure 36:
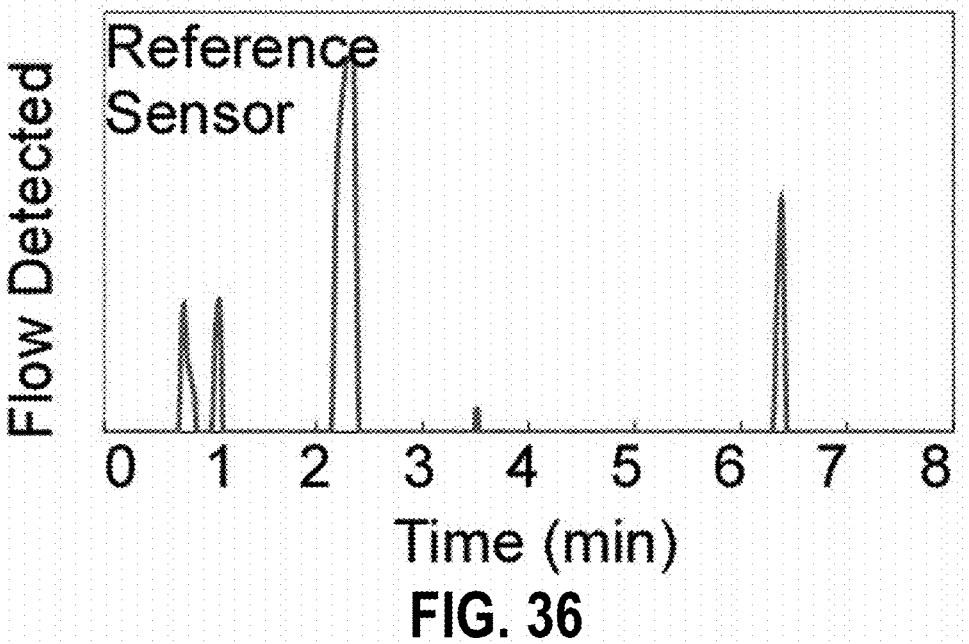
FIG. 36 is a graphical view of data from a commercial ultrasonic flow sensor used to evaluate the accuracy of the signal strength indicator of FIG. 35 as a waterflow indicator.

FIG. 33 depicts a graph showing a segment of raw acoustic data collected at the field test site. FIG. 34 depicts a graph showing the calculated signal strength indicator after the raw acoustic data has been processed by the pre-filtering and data processing blocks. FIG. 35 depicts a graph showing the cleaned signal strength indicator signal after being processed by the post-filtering block. FIG. 36 depicts a graph showing the data from a commercial ultrasonic flow sensor used as a reference to evaluate the accuracy of the acoustic flow algorithm by comparison. The plots from the acoustic flow algorithm closely match the output of the reference sensor, thereby demonstrating the effectiveness of acoustic flow algorithm in accurately detecting waterflow events.

Figure 37:
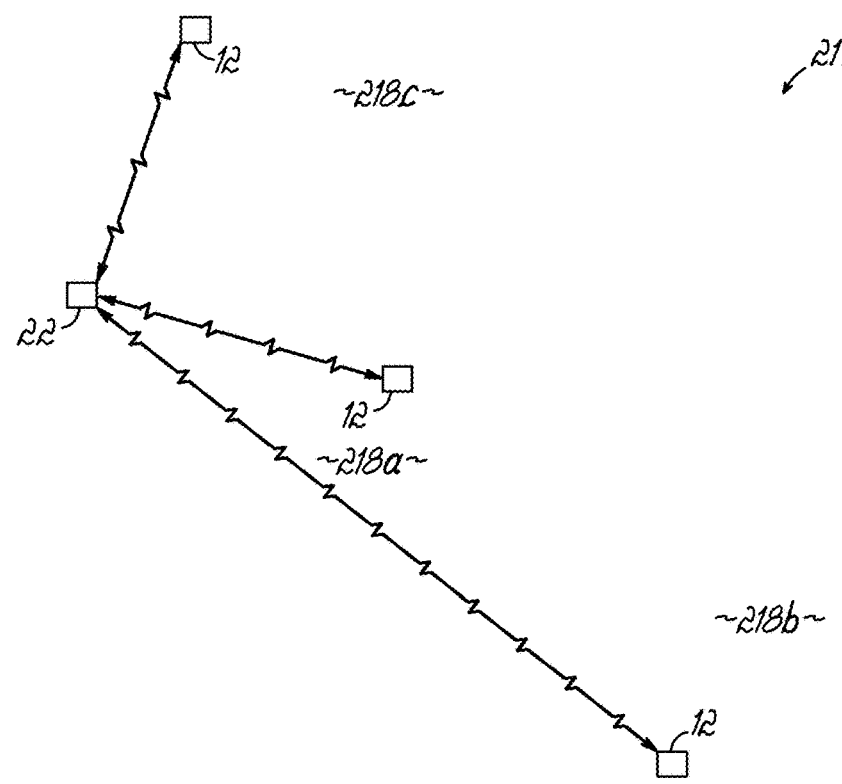
FIG. 37 is a schematic view of a building floor plan of a field test location.

FIG. 37 depicts a floor plan 217 of a building including three test sites 218a-218c where a comprehensive system test was conducted to verify the functionality of the sensor modules 12 individually and the wireless sensor network 10 as a whole. The wireless sensor network 10 included three sensor modules 12, a wireless network gateway 22 (e.g., a Zigbee gateway) and wireless routers (not shown). A sensor module 12 was mounted to a water pipe 18 in each of the three test sites 218a-218c. The sensor module 12 at test site 218a included both an acoustic flow sensor 38 and a thermal flow sensor 40, whereas the test module 12 at each of test site 218b and test site 218c only included an acoustic flow sensor 38. The distances between the sensor modules and the Zigbee gateway were about 3.0 meters (test site 218a), 17.5 meters (test site 218b), and 4.0 meters (test site 218c). The acoustic flow sensors 38 and thermal flow sensor 40 were simultaneously evaluated for waterflow detection. The wireless sensor network 10 was effectively validated for its performance and suitability for its intended purpose.

Figure 38:
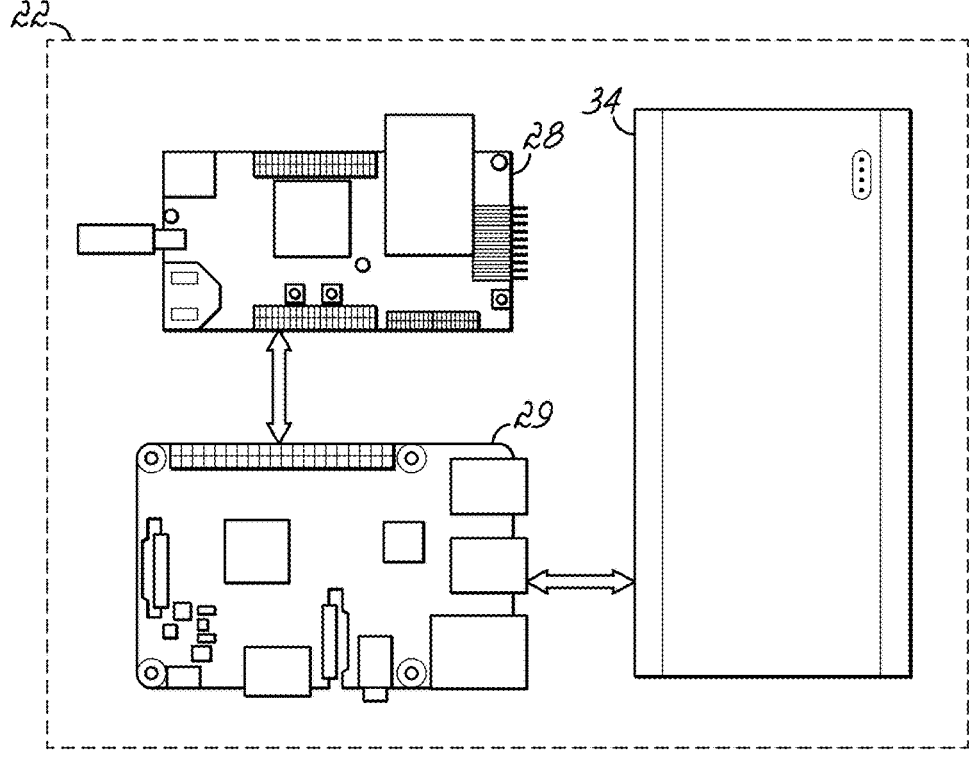
FIG. 38 is a diagrammatic view of an exemplary wireless network gateway.

FIG. 38 depicts an exemplary wireless network gateway 22 (e.g., Zigbee gateway) used in the test system. The wireless network gateway 22 included a computer module 29 (e.g., a Raspberry Pi) operatively coupled to a wireless coordinator 28 (e.g., a Silicon Labs EFR32MG21 microcontroller unit) and a power source 34 comprising a portable battery at the field test site.

Figure 39:
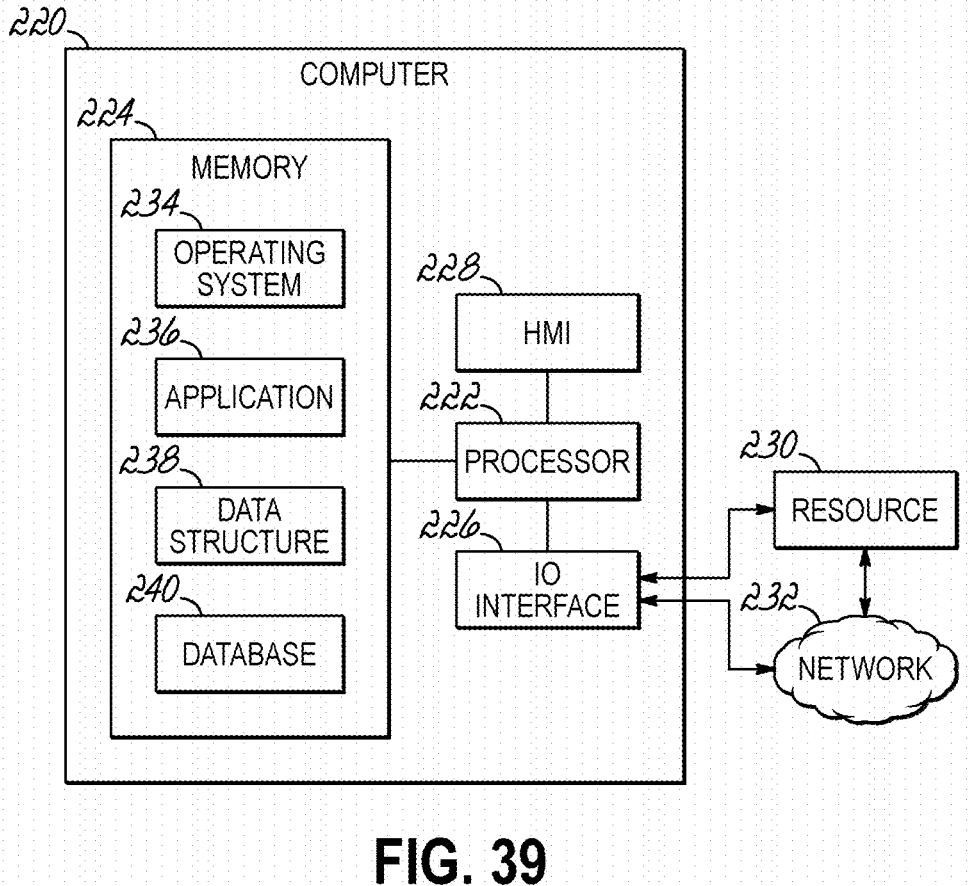
FIG. 39 is a diagrammatic view of a computer that may be used to implement one or more of the components or processes shown in the above FIGS.

Referring now to FIG. 39, embodiments of the invention described above, or portions thereof, may be implemented using one or more computer devices or systems, such as exemplary computer 220. The computer 220 may include a processor 222, a memory 224, an input/output (I/O) interface 226, and a Human Machine Interface (HMI) 228. The computer 220 may also be operatively coupled to one or more external resources 230 via the network 232 and/or I/O interface 226. External resources may include, but are not limited to, servers, databases, mass storage devices, peripheral devices, cloud-based network services, or any other resource that may be used by the computer 220.

The processor 222 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions stored in memory 224. Memory 224 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or data storage devices such as a hard drive, optical drive, tape drive, volatile or non-volatile solid state device, or any other device capable of storing data.

The processor 222 may operate under the control of an operating system 234 that resides in memory 224. The operating system 234 may manage computer resources so that computer program code embodied as one or more computer software applications, such as an application 236 residing in memory 224, may have instructions executed by the processor 222. In an alternative embodiment, the processor 222 may execute the application 236 directly, in which case the operating system 234 may be omitted. One or more data structures 238 may also reside in memory 224, and may be used by the processor 222, operating system 234, or application 236 to store or manipulate data.

The I/O interface 226 may provide a machine interface that operatively couples the processor 222 to other devices and systems, such as the external resource 230 or the network 232. The application 236 may thereby work cooperatively with the external resource 230 or network 232 by communicating via the I/O interface 226 to provide the various features, functions, applications, processes, or modules comprising embodiments of the invention. The application 236 may also have program code that is executed by one or more external resources 230, or otherwise rely on functions or signals provided by other system or network components external to the computer 220. Indeed, given the nearly endless hardware and software configurations possible, persons having ordinary skill in the art will understand that embodiments of the invention may include applications that are located externally to the computer 220, distributed among multiple computers or other external resources 230, or provided by computing resources (hardware and software) that are provided as a service over the network 232, such as a cloud computing service.

The HMI 228 may be operatively coupled to the processor 222 of computer 220 to allow a user to interact directly with the computer 220. The HMI 228 may include video or alphanumeric displays, a touch screen, a speaker, and any other suitable audio and visual indicators capable of providing data to the user. The HMI 228 may also include input devices and controls such as an alphanumeric keyboard, a pointing device, keypads, pushbuttons, control knobs, microphones, etc., capable of accepting commands or input from the user and transmitting the entered input to the processor 222.

A database 240 may reside in memory 224, and may be used to collect and organize data used by the various systems and modules described herein. The database 240 may include data and supporting data structures that store and organize the data. In particular, the database 240 may be arranged with any database organization or structure including, but not limited to, a relational database, a hierarchical database, a network database, or combinations thereof. A database management system in the form of a computer software application executing as instructions on the processor 222 may be used to access the information or data stored in records of the database 240 in response to a query, which may be dynamically determined and executed by the operating system 234, other applications 236, or one or more modules.

In general, the routines executed to implement the embodiments of the invention, whether implemented as part of an operating system or a specific application, component, program, object, module or sequence of instructions, or a subset thereof, may be referred to herein as "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of the embodiments of the invention. Computer-readable program instructions for carrying out operations of the embodiments of the invention may be, for example, assembly language, source code, or object code written in any combination of one or more programming languages. The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

The terminology used herein is for the purpose of describing particular embodiments only and is not intended to be limiting of the embodiments of the invention. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but do not preclude the presence or addition of one or more other features, integers, actions, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A plumbing sensor system, comprising:
an acoustic flow sensor configured to receive sound from a waterpipe;
a thermal flow sensor configured to detect waterflow in the waterpipe;
one or more processors in communication with the acoustic flow sensor and the thermal flow sensor; and
a memory coupled to the one or more processors and including program code that, when executed by the one or more processors, causes the system to:
in response to the sound received by the acoustic flow sensor exceeding an acoustic threshold:
collect acoustic data,
determine if the acoustic data is indicative of the waterflow,
in response to the acoustic data being indicative of the waterflow, activate the thermal flow sensor,
in response to the acoustic data being not being indicative of the waterflow, not activate the thermal flow sensor; and
in response to the sound received by the acoustic flow sensor not exceeding the acoustic threshold, not collect the acoustic data.

2. The system of claim 1, wherein:

the acoustic flow sensor is configured to transmit a trigger signal to the one or more processors in response to the sound received from the waterpipe exceeding the acoustic threshold, and the program code is configured to cause the system to collect the acoustic data from the acoustic flow sensor in response to receiving the trigger signal.

3. The system of claim 1, wherein the program code further causes the system to:

in response to activating the thermal flow sensor, receive temperature data from the thermal flow sensor indicative of a temperature of the waterpipe at each of at least two different points on the waterpipe; and determine a water flow rate in the waterpipe based on the temperature data.

4. The system of claim 1, wherein while the thermal flow sensor is inactive, the program code causes the system to determine if the acoustic data is indicative of the waterflow by:

filtering noise from the acoustic data to generate filtered acoustic data;

generating a signal strength indicator based on the filtered acoustic data;

comparing the signal strength indicator to a flow event start threshold;

determining the acoustic data is indicative of the waterflow if the signal strength indicator exceeds the flow event start threshold; and determining the acoustic data is not indicative of the waterflow if the signal strength indicator does not exceed the flow event start threshold.

5. The system of claim 1, wherein while the thermal flow sensor is active, the program code further causes the system to:

in response to the acoustic data being indicative of the waterflow, collect temperature data from the thermal flow sensor; and in response to the acoustic data not being indicative of the waterflow, deactivate the thermal flow sensor.

6. The system of claim 5, wherein the program code further causes the system to:

in response to the acoustic data not being indicative of the waterflow, record the temperature data; and transmit the acoustic data and the temperature data to a remote server.

7. The system of claim 5, wherein the program code causes the system to determine if the acoustic data is indicative of the waterflow by:

filtering noise from the acoustic data to generate filtered acoustic data;

generating a signal strength indicator based on the filtered acoustic data;

comparing the signal strength indicator to a signal strength threshold;

determining the acoustic data is indicative of the waterflow if the signal strength indicator exceeds the signal strength threshold; and determining the acoustic data is not indicative of the waterflow if the signal strength indicator does not exceed the signal strength threshold.

8. The system of claim 7, wherein the signal strength threshold is a flow event stop threshold.

9. The system of claim 1, wherein the thermal flow sensor includes:

a heater bridge including a span and a heating element positioned on a waterpipe-facing side of the span, the span including a recess on each side of the heating element that thermally isolates the heating element from at least one of the span and the waterpipe.

10. The system of claim 1, further comprising:

a wireless transceiver;

a remote server; and a wireless network gateway in communication with the sensor module and the remote server, wherein the program code causes the system to transmit the acoustic data to the remote server through the wireless network gateway.

11. The system of claim 1, wherein the acoustic flow sensor includes:

a circuit board having an outward facing side, a waterpipe-facing side, and a through hole connecting the outward facing side to the waterpipe-facing side;

an acoustic transducer operatively coupled to the outward facing side of the circuit board proximate to the through hole; and an acoustic coupler configured to define an acoustic chamber between the waterpipe-facing side of the through hole and the waterpipe.

12. A method of monitoring a plumbing system, comprising:

receiving sound at an acoustic flow sensor operatively coupled to a waterpipe;

in response to the sound received by the acoustic flow sensor exceeding an acoustic threshold:

collecting acoustic data, in response to the acoustic data being indicative of waterflow, activating a thermal flow sensor, and in response to the acoustic data not being indicative of the waterflow, not activating the thermal flow sensor; and in response to the sound received by the acoustic flow sensor not exceeding the acoustic threshold, not collecting the acoustic data.

13. The method of claim 12, wherein the acoustic flow sensor includes an acoustic transducer, and further comprising:

receiving a trigger signal from the acoustic transducer in response to the sound received from the waterpipe exceeding the acoustic threshold;

in response to receiving the trigger signal, collecting the acoustic data from the acoustic flow sensor; and determining if the acoustic data is indicative of waterflow.

14. The method of claim 13, wherein determining if the acoustic data is indicative of the waterflow includes:

filtering noise from the acoustic data to generate filtered acoustic data;

generating a signal strength indicator based on the filtered acoustic data;

comparing the signal strength indicator to a flow event start threshold;

determining the acoustic data is indicative of the waterflow if the signal strength indicator exceeds the flow event start threshold; and determining the acoustic data is not indicative of the waterflow if the signal strength indicator does not exceed the flow event start threshold.

15. A method of monitoring a plumbing system, comprising:

receiving sound at an acoustic flow sensor operatively coupled to a waterpipe;

in response to the sound received by the acoustic flow sensor exceeding an acoustic threshold:

collecting acoustic data from the acoustic flow sensor, determining if the acoustic data is indicative of water-flow, in response to the acoustic data being indicative of the waterflow, collecting temperature data from a thermal flow sensor, and in response to the acoustic data not being indicative of the waterflow, deactivating the thermal flow sensor; and in response to the sound received by the acoustic flow sensor not exceeding the acoustic threshold, not collecting the acoustic data.

16. The method of claim 15, further comprising:

in response to the acoustic data not being indicative of the waterflow, recording the temperature data; and transmitting the acoustic data and the temperature data to a remote server.

17. The method of claim 16, wherein the acoustic data and the temperature data is transmitted to the remote server through a wireless network gateway.

18. The method of claim 16, wherein determining if the acoustic data is indicative of the waterflow includes:

filtering noise from the acoustic data to generate filtered acoustic data;

generating a signal strength indicator based on the filtered acoustic data;

comparing the signal strength indicator to a signal strength threshold;

determining the acoustic data is indicative of the waterflow if the signal strength indicator exceeds the signal strength threshold; and determining the acoustic data is not indicative of the waterflow if the signal strength indicator does not exceed the signal strength threshold.

\* \* \* \* \*